(12) United States Patent
Domm

(10) Patent No.: US 9,335,612 B2
(45) Date of Patent: May 10, 2016

(54) SYSTEM FOR UNIFORM DISTRIBUTION OF LIGHT USING AN ARRAY OF LENSLETS

(71) Applicant: CHRISTIE DIGITAL SYSTEMS USA, INC., Cypress, CA (US)

(72) Inventor: John Domm, Kitchener (CA)

(73) Assignee: CHRISTIE DIGITAL SYSTEMS USA, INC., Cypress, CA (US)

( * ) Notice: Subject to any disclaimer, the term of this patent is extended or adjusted under 35 U.S.C. 154(b) by 238 days.

(21) Appl. No.: 14/084,970

(22) Filed: Nov. 20, 2013

(65) Prior Publication Data
US 2015/0138511 A1 May 21, 2015

(51) Int. Cl.
G03B 21/20 (2006.01)
G03B 21/14 (2006.01)
H04N 9/31 (2006.01)
G02B 27/10 (2006.01)
G02B 27/14 (2006.01)
(Continued)

(52) U.S. Cl.
CPC .......... *G03B 21/142* (2013.01); *G02B 27/0994* (2013.01); *G02B 27/106* (2013.01); *G02B 27/145* (2013.01); *G03B 21/14* (2013.01); *G03B 21/208* (2013.01); *H04N 9/3105* (2013.01); *H04N 9/3147* (2013.01); *H04N 9/3152* (2013.01); *G02B 6/0008* (2013.01); *G02B 6/0028* (2013.01); *G02B 6/262* (2013.01); *G02B 27/0944* (2013.01)

(58) Field of Classification Search
CPC . G02B 27/0944; G02B 6/0028; G03B 21/208
See application file for complete search history.

(56) References Cited

U.S. PATENT DOCUMENTS 4,421,383 A * 12/1983 Carlsen ................... G02B 6/32
385/72
5,530,940 A * 6/1996 Ludwig, Jr. .......... G02B 6/4298
385/146

(Continued)

FOREIGN PATENT DOCUMENTS

EP 0777389 A2 6/1997
EP 1338846 A2 8/2003

OTHER PUBLICATIONS

Extended European Search Report dated Apr. 14, 2015, issued on counterpart European Patent Application No. 14275236.9.

*Primary Examiner* — Bao-Luan Le
(74) *Attorney, Agent, or Firm* — Perry + Currier, Inc.

(57) ABSTRACT

A system for uniform distribution of light is provided. The system comprises: an integrating rod comprising an output end opposite an input end, the integrator rod configured to emit, at the output end an integrated image of light received at the input end, the integrated image having an etendue $E_{img}$ and an area $A_{img}$ at a given distance from the output end; and, an apparatus comprising an input side located at the given distance, the apparatus configured to: receive, at the input side, the integrated image from the output end of the integrating rod; split the integrated image into a number N of sub-images, each of the sub-images having an area $A_{sub}$, and an etendue $E_{sub}$, such that $A_{img}$ is about $N*A_{sub}$, and $E_{img}$ is about $N*E_{sub}$; and, relay the sub-images.

10 Claims, 20 Drawing Sheets

(51) Int. Cl.
 *F21V 8/00* (2006.01)
 *G02B 27/09* (2006.01)
 *G02B 6/26* (2006.01)

(56) References Cited

U.S. PATENT DOCUMENTS

| | | | | |
|---|---|---|---|---|
| 5,765,934 A * | 6/1998 | Okamori | ............ | G02B 6/0006 348/E5.144 |
| 5,838,865 A * | 11/1998 | Gulick | .................. | G02B 6/06 348/E5.141 |
| 5,862,285 A * | 1/1999 | Danielian | ............ | G01N 21/474 385/116 |
| 6,203,208 B1 * | 3/2001 | Stupar | ................ | G02B 6/3809 362/581 |
| 6,296,383 B1 * | 10/2001 | Henningsen | ........ | B60Q 1/0011 250/221 |
| 6,513,937 B1 * | 2/2003 | Dehmlow | ............ | G03B 21/26 353/12 |
| 6,614,972 B1 * | 9/2003 | Lundin | ................ | G02B 6/0005 385/115 |
| 6,618,530 B1 * | 9/2003 | Lundin | ................ | G02B 6/0005 385/119 |
| 6,707,964 B2 * | 3/2004 | Dimas | .................. | B29C 71/04 385/147 |
| 6,744,566 B2 * | 6/2004 | Ludington | ............ | G02B 6/32 359/717 |
| 6,846,082 B2 * | 1/2005 | Glent-Madsen | .... | G02F 1/13336 348/E9.012 |
| 7,068,883 B2 * | 6/2006 | Ludington | ........... | G02B 6/2937 385/33 |
| 7,542,206 B2 * | 6/2009 | Schuck | ................ | G02B 6/0096 353/20 |
| 7,872,219 B2 * | 1/2011 | Shimaoka | ............ | G03B 21/208 250/216 |
| 7,982,954 B2 * | 7/2011 | Schuck | ................ | G02B 6/0096 353/20 |
| 8,335,412 B2 * | 12/2012 | Lin | ........................ | G02B 6/32 385/33 |
| 8,454,243 B2 * | 6/2013 | Hsu | ........................ | G02B 6/32 385/74 |
| 2003/0151727 A1 * | 8/2003 | Glent-Madsen | .... | G02F 1/13336 353/94 |
| 2008/0018861 A1 * | 1/2008 | Schuck | ................ | G02B 6/0096 353/20 |
| 2008/0018999 A1 * | 1/2008 | Schuck | ................ | G02B 6/0096 359/489.07 |
| 2008/0174868 A1 * | 7/2008 | Schuck | ................ | G02B 6/0096 359/485.06 |
| 2009/0168448 A1 * | 7/2009 | Ma | ...................... | G02B 6/0006 362/551 |
| 2010/0165300 A1 * | 7/2010 | Shimaoka | ............. | G03B 33/06 353/33 |
| 2011/0286697 A1 * | 11/2011 | Lin | ........................ | G02B 6/32 385/33 |

\* cited by examiner

SYSTEM FOR UNIFORM DISTRIBUTION OF LIGHT USING AN ARRAY OF LENSLETS

FIELD

The specification relates generally to projectors, and specifically to a system for uniform distribution of light.

BACKGROUND

In projection systems that use lasers as a light source, light from red, green and blue lasers are fed into a common optical fiber to create white light, which is conveyed to a projection system for use in forming images for projection. Hence, three separate electrical drivers, three separate thermal management systems and three separate optical paths are needed. This is a complex system which results in a high cost due to both materials and manufacturing complexity. Further, distribution of such light to various projectors can be complex and/or difficult to achieve and/or inefficient, without losing light. For example, distribution of light from a single light source into two or more channels with equal intensity while losing little or no light in the process is challenging. Similarly, adjusting and/or tuning light intensity to multiple projectors while losing little or no light little is also challenging.

SUMMARY

In general, this disclosure is directed to a system with a single colour light source (including, but not limited to, a combination of red, green and blue light sources producing white light, and/or a lamp) and having a light distribution system configured to distribute light, from the light source, to a plurality of projectors for use in forming images for projection. In some implementations a blue laser can be used as the light source and the light distribution system can distribute blue laser light to colour conversion systems which converts the blue laser light to other colours, for example, red light and green light. Use of blue laser light as the source light, rather than a combination of light from red, green and blue lasers, results in a single electrical driver type, a single thermal management system, with single target cooling temperature, and a single optical path. The light distribution system can be agnostic to the colour of light and can be used to distribute white light, red light, green light, blue light and/or a combination thereof. The light distribution system can be configured to equally distribute light to a plurality of projectors, and/or colour conversion systems, by partitioning an image of an integrator into sub-areas with an etendue that is matched from the source to an optical fiber (and thus a corresponding projector). Alternatively, the light distribution system can be configured to distributed light to a plurality of projectors, and/or colour conversion systems, using tunable reflectivity/tunable transmission devices. Each light distribution described herein can achieve such respective functionality with little to no loss of light.

In this specification, elements may be described as "configured to" perform one or more functions or "configured for" such functions. In general, an element that is configured to perform or configured for performing a function is configured to perform the function, or is suitable for performing the function, or is adapted to perform the function, or is operable to perform the function, or is otherwise capable of performing the function.

In this specification, language of "at least one of X, Y, and Z" and "one or more of X, Y and Z" can be construed as X only, Y only, Z only, or any combination of two or more items X, Y, and Z (e.g., XYZ, XYY, YZ, ZZ, and the like). Similar logic can be applied for two or more items in any occurrence of "at least one . . . " and "one or more . . . " language.

The specification provides a system comprising: an integrating rod comprising an output end opposite an input end, the integrator rod configured to emit, at the output end an integrated image of light received at the input end, the integrated image having an etendue $E_{img}$ and an area $A_{img}$ at a given distance from the output end; and, an apparatus comprising an input side located at the given distance, the apparatus configured to: receive, at the input side, the integrated image from the output end of the integrating rod; split the integrated image into a number N of sub-images, each of the sub-images having an area $A_{sub}$, and an etendue $E_{sub}$, such that $A_{img}$ is about $N*A_{sub}$, and $E_{img}$ is about $N*E_{sub}$; and, relay the sub-images. $A_{img}$ can be equal to $N*A_{sub}$. $E_{img}$ can be equal to $N*E_{sub}$.

The apparatus can comprise: a plurality of sub-integrating rods in a one-to-one relationship with the number N of the sub-images, each of the plurality of sub-integrating rods configured to form a respective one of the sub-images, the plurality of sub-integrating rods comprising respective inputs adjacent to one another located at the given distance, forming the input side of the apparatus, the respective inputs adjacent the output end of the integrator rod, a total area of the respective inputs, and an output area of the output end, each similar to the area $A_{img}$ of the integrated image. A respective area of each of the respective inputs can all be about equal to one another. The integrated image can be formed at the respective inputs of the plurality of integrating rods. A respective etendue $E_{rod}$ of each of the sub-integrating rods can be about equal to the etendue $E_{sub}$ of the sub-images. The respective inputs of the plurality of sub-integrating rods can be stacked. The plurality of sub-integrating rods can be stacked such that respective longitudinal axes of the plurality of sub-integrating rods are generally parallel. Each of the plurality of sub-integrating rods can be of different lengths, and a respective output of each of the plurality of sub-integrating rods can be configured to relay a respective sub-image to a different respective position. The system can further comprise a plurality of relay lenses, in a one-to-one relationship with the plurality of sub-integrating rods, each of the plurality of relay lenses located at one of the different respective positions, each of the plurality of relay lenses configured to further relay a respective sub-image. The system can further comprise a plurality of optical fibers, in a one-to-one relationship with the plurality of relay lenses, each of the plurality of optical fibers configured to receive the respective sub-image relayed by a respective relay lens.

The apparatus can comprise: an array of lenslets in a one-to-one relationship with the number N of the sub-images, each of the lenslets configured to form a respective one of the sub-images, the array of lenslets comprising respective inputs adjacent to one another at the given distance, forming the input side of the apparatus; and, a telecentric relay system located between the output end of the integrating rod and the array of lenslets, the telecentric relay system configured to relay the integrated image to the respective inputs of the array of lenslets, a total area of the respective inputs is about the area $A_{img}$ of the integrated image at the given distance. The total area of the respective inputs can be less than the area $A_{img}$ of the integrated image at the given distance. The integrated image can be formed, by the telecentric relay system, at the respective inputs of the lenslets. A respective etendue $E_{lenslet}$ of each of the lenslets can be about equal to the etendue $E_{sub}$ of the sub-images. The telecentric relay system can be configured to magnify the integrated image to one of increase or decrease the area $A_{img}$ of the integrated image at the given distance. The output end of the integrating rod can be located at an image position of the telecentric relay system, and the respective inputs of the array of lenslets are located at an image position of the of the telecentric relay system, coincident with the given distance. The system can further comprise a plurality of optical fibers, in a one-to-one relationship with the array of lenslets, each of the plurality of optical fibers configured to receive and relay a respective sub-image relayed by a respective lenslet. Each of the plurality of optical fibers can have an etendue $E_{fiber}$ about equal to the etendue $E_{sub}$ of the sub-images. The array of lenslets can comprise an integrated structure.

Another aspect of the present specification provides a method comprising: receiving an integrated image from an output end of an integrating rod; splitting the integrated image into a number N of sub-images, each of the sub-images having an area $A_{sub}$, and an etendue $E_{sub}$, such that an area $A_{img}$ of the integrated image at a given distance from the output end, where the integrated image is received, is about $N*A_{sub}$, and an etendue of the given image $E_{img}$ is about $N*E_{sub}$; and, relaying the sub-images.

BRIEF DESCRIPTIONS OF THE DRAWINGS

For a better understanding of the various implementations described herein and to show more clearly how they may be carried into effect, reference will now be made, by way of example only, to the accompanying drawings in which.

DETAILED DESCRIPTION

Figure 1:
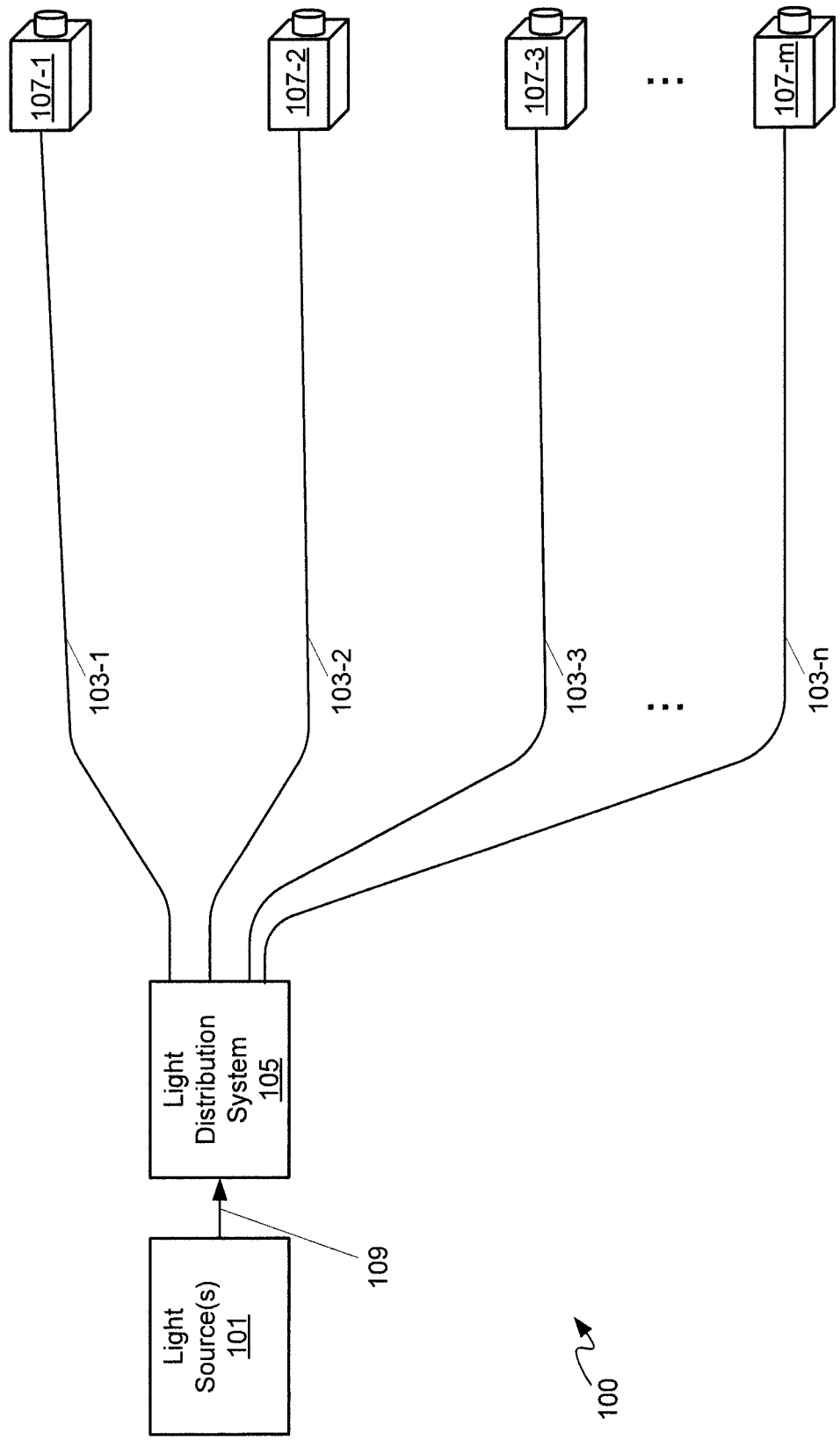
FIG. 1 depicts a system for distributing light to a plurality of projectors, according to non-limiting implementations.

FIG. 1 depicts a system 100 for distributing light to a plurality of projectors. System 100 comprises: a light source 101; a plurality of optical fibers 103-1, 103-2, 103-3 . . . 103-n; a light distribution system 105 configured to receive light from light source 101 and distribute the light to plurality of optical fibers 103-1, 103-2, 103-3 . . . 103-n; and, a plurality of projectors 107-1, 107-2, 103-7 . . . 107-m configured to receive the light from one or more of the plurality of optical fibers 103-1, 103-2, 103-3 . . . 103-n for use in projecting images.

Plurality of optical fibers 103-1, 103-2, 103-3 . . . 103-n will be referred to hereafter, collectively, as optical fibers 103, and generically as an optical fiber 103; similarly, plurality of projectors 107-1, 107-2, 107-3 . . . 107-m will be referred to hereafter, collectively, as projectors 107, and generically as a projector 107.

While "n" optical fibers 103 and "m" projectors 107 are depicted, any number of optical fibers 103 and projectors 107 are within the scope of present implementations. Further, a number "n" of optical fibers 103 and a number "m" of projectors 107 can be the same or different: as depicted, the number "n" of optical fibers 103 and the number "m" of projectors 107 are the same (i.e. "n"="m"). However, in other implementations, where the number "n" of optical fibers 103 and the number "m" of projectors 107 are not the same, more than one optical fiber 103 can relay light a single projector 107 (i.e. "n">"m"). Further, using optical fiber "Y" cables, bifurcated optical fiber cables, and the like, an optical fiber 103 can relay light to more than one projector 107 (i.e. "n"<"m").

Further, while each optical fiber 103 is depicted as a single optical fiber, each optical fiber 103 can comprise a plurality of optical fibers and/or optical fiber bundles, for example when light source 101 comprises a white light source and/or a white laser light source (i.e. a combination of red, green and blue lasers).

Light distribution system 105 can comprise an equal intensity light distribution system configured to distribute light, from light source 101, about equally to each of optical fibers 103. Non-limiting implementations of equal intensity light distribution systems are described below with respect to FIGS. 5 to 10. Alternatively, light distribution system 105 can comprise a configurable light distribution system configured to distribute light, from light source 101 to optical fibers 103, in controllable and/or changeable and/or configurable amounts. Non-limiting implementations of configurable intensity light distribution systems are described below with respect to FIGS. 11 to 20.

Light source 101 can comprise a white light source which, in turn, can comprise at least one red laser, at least one green laser and at least one blue laser; in these implementations, system 100 comprises optical components for receiving and combining red, green and blue light into white light; such components can be located at either light source 101, light distribution system 105 or there between, for example on a light path 109 between light source 101 and light distribution system 105. However, when light source 101 comprises three different types of lasers, each laser type is generally operated under different conditions, including, but not limited to, different electrical conditions and different temperature conditions, and hence system 100 would then comprise three different types of electrical drivers, three different thermal management systems etc., which increases both materials costs and manufacturing complexity of system 100.

Figure 2:
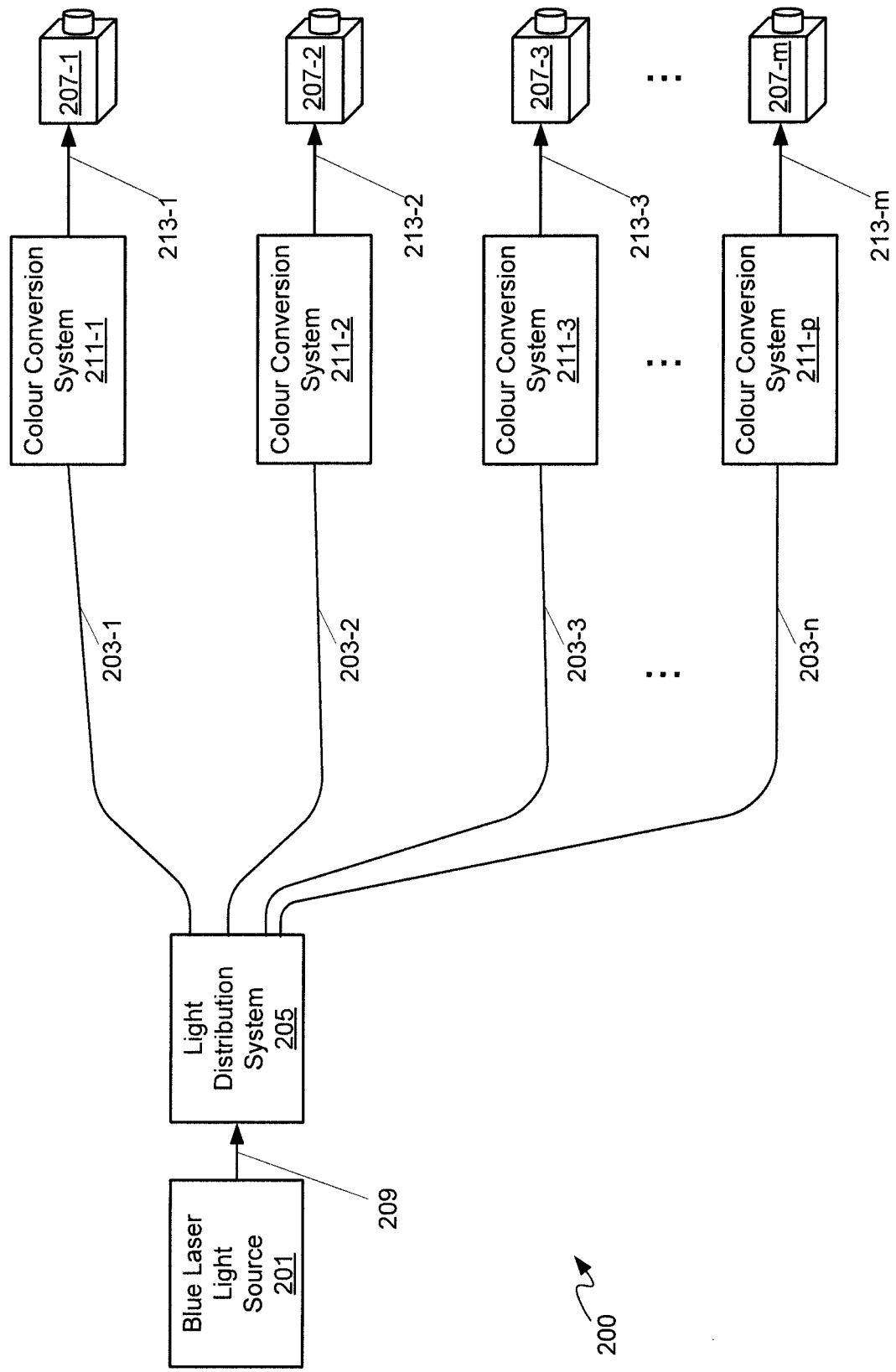
FIG. 2 depicts a system for distributing blue laser light to a plurality of projectors, according to non-limiting implementations.

However, complexity and materials costs can be reduced by using a blue laser light source as light source 101, and colour conversion systems for converting the blue laser light to light of other colours (e.g. red light and green light) which can be combined with the blue light thereafter for use in projecting images at projectors. For example, attention is next directed to FIG. 2, which depicts a system 200 that is substantially similar to system 100, with like elements having like numbers, however preceded by a "2" rather than a "1". System 200 comprises: a blue laser light source 201; a plurality of optical fibers 203-1, 203-2, 203-3 . . . 203-n; a light distribution system 205 configured to receive blue laser light from blue laser light source 201 (for example, via a light path 209) and distribute the blue laser light to the plurality of optical fibers 203-1, 203-2, 203-3 . . . 203-n; a plurality of colour conversion systems 211-1, 211-2, 211-3 . . . 211-p, each configured to: receive the blue laser light from at least one of the plurality of optical fibers 203-1, 203-2, 203-3 . . . 203-n; and convert the blue laser light to at least one other colour of light different from the blue laser light; and, a plurality of projectors 207-1, 207-2, 207-3 . . . 207-m configured to receive the at least one other colour of light, from the plurality of colour conversion systems 211-1, 211-2, 211-3 . . . 211-p, for use in projecting images, for example along a respective light path 213-1, 213-2, 213-3 . . . 213-m.

Hence, system 200 is similar to system 100, however system 200 comprises a blue laser light source 201, rather than, for example, a white light source, and system 200 further comprises a plurality of colour conversion systems 211-1, 211-2, 211-3 . . . 211-p for converting the blue light to light of other colours, such as red light and green light.

Plurality of optical fibers 203-1, 203-2, 203-3 . . . 203-n will be referred to hereafter, collectively, as optical fibers 203, and generically as an optical fiber 203; similarly, plurality of colour conversion systems 211-1, 211-2, 211-3 . . . 211-p will be referred to hereafter, collectively, as colour conversion systems 211, and generically as an colour conversion system 211; and, similarly, plurality of projectors 207-1, 207-2, 207-3 . . . 207-m will be referred to hereafter, collectively, as projectors 207, and generically as a projector 207. Plurality of light paths 213-1, 213-2, 213-3 . . . 213-m will be referred to hereafter, collectively, as light paths 213, and generically as a light path 213.

While "n" optical fibers 203, "m" projectors 207, and "p" colour conversion systems 211 are depicted, any number of optical fibers 203, projectors 207, and colour conversion system 211 are within the scope of present implementations. Further, each of a number "n" of optical fibers 203, a number "m" of projectors 207 and a number "p" of colour conversion system 211 can be the same or different: as depicted, the number "n" of optical fibers 203, the number "m" of projectors 207, and the number "p" of colour conversion systems 211 are the same (i.e. "n"="m"="p").

However, the number "n" of optical fibers 203 can be greater than or less than a number "p" of colour conversion systems 211. For example, more than one optical fiber 203 can relay light a single colour conversion systems 211 (i.e. "n">"p"). Further, using optical fiber "Y" cables, and the like, an optical fiber 203 can relay light to more than one colour conversion systems 211 (i.e. "n"<"p").

Further, while each optical fiber 203 is depicted as a single optical fiber, each optical fiber 203 can comprise a plurality of optical fibers and/or optical fiber bundles. However, as described below, each optical fiber 203 can comprise a patchcord, which is generally less expensive than optical fiber bundles.

In depicted implementations, plurality of colour conversion systems 211 are in a one-to-one relationship with plurality of projectors 207, such that a given colour conversion system 211 is dedicated to providing the at least one other colour of light to a given projector 207.

However, in other implementations, a number "p" of colour conversion systems 211 can be less than a number "n" of projectors 207, with one or more of the colour conversion systems 211 relaying light to more than one projector 207 along more than one light path 213. In other implementations, a number "p" of colour conversion systems 211 can be more than a number "n" of projectors 207, with one or more of projectors 207 receiving light from more than one colour conversion system 211, along more than one light path 213. Hence, generically, one or more colour conversion systems 211 can provide light for one or more projectors 207.

Further, each light path 213 can comprise optical components configured to relay light to one or more projectors 207 from one or more colour conversion systems 211, including, but not limited to, lenses, prisms, mirrors, optical fibers and the like.

Each colour conversion system 211 is configured to receive blue laser light from at least one optical fiber 203 and convert at least a portion of the blue laser light to at least one other colour of light different from the blue laser light.

Figure 3:
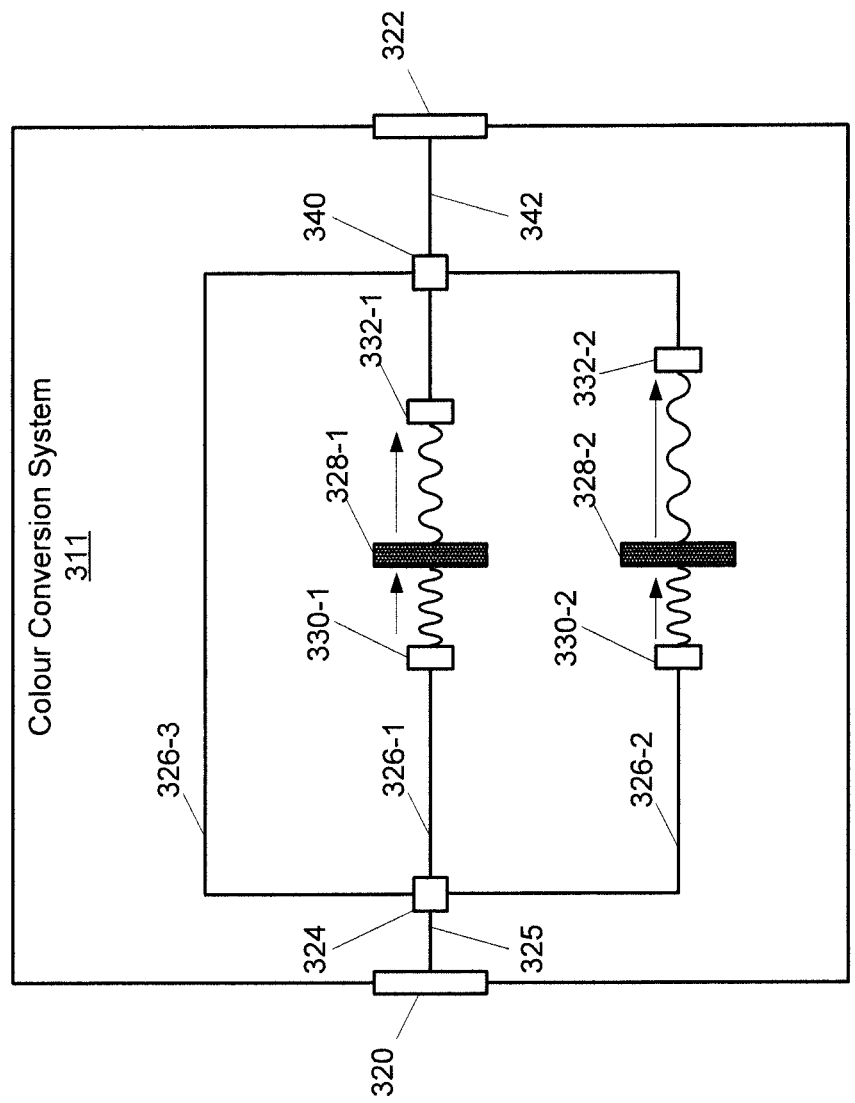
FIG. 3 depicts a colour conversion system for use with the system of FIG. 2, according to non-limiting implementations.

For example, attention is directed to FIG. 3 which depicts an example colour conversion system 311; each colour conversion system 211 can be similar to colour conversion system 311, however other implementations are within the scope of the present specification. Colour conversion system comprises an input 320 configured to receive and/or mate with output ends of one or more of optical fibers 203, and hence is also configured to receive blue laser light from blue laser source 201. Colour conversion system 311 further comprises an output 322 for conveying light exiting conversion system 311 to one or more light paths 213, and hence one or more projectors 207.

Colour conversion system 311 further comprises a beam splitter 324, and/or the like, for receiving the blue laser light from input 320 and splitting the blue laser light into three light paths 326-1, 326-2, 326-3. A light path 325 between input 320 and beam splitter 324 can comprise optical components for conveying the blue laser light to beam splitter 324.

Colour conversion system 311 further comprises at least one colour change medium 328-1, 328-2 configured to receive blue laser light and convert the blue laser light to at least one other colour of light, for example red light and/or green light. As depicted colour conversion system 311 comprises two colour change mediums 328-1, 328-2. Each colour change medium 328-1, 328-2 can comprise one or more of a phosphor, quantum dots and the like. Colour change medium 328-1 can be configured to convert blue laser light to green light and hence comprises a corresponding phosphor and/or corresponding quantum dots and/or the like. Similarly, colour change medium 328-2 can be configured to convert blue laser light to red light and hence comprises a corresponding phosphor and/or corresponding quantum dots and/or the like. For each colour change medium 328-1, 328-2, colour emitted there from can be coherent, partially coherent and/or incoherent. However, light emitted from phosphors and quantum dots is generally incoherent.

A first light path 326-1 hence comprises optical components for conveying the blue laser light from beam splitter 324 to an optical component 330-1 (e.g. any suitable combination of lenses, prisms, mirrors and the like) configured to irradiate colour change medium 328-1 with the blue laser light, which is collected by an optical component 332-1 (e.g. any suitable combination of lenses, prisms, mirrors and the like). The direction of light is indicated by the arrows in FIG. 3, and the change in colour is indicated by light emitted by colour change medium 328-1 having a longer wavelength than light irradiating colour change medium 328-1.

A second light path 326-2 hence comprises optical components for conveying the blue laser light from beam splitter 324 to an optical component 330-2 (e.g. any suitable combination of lenses, prisms, mirrors and the like) configured to irradiate colour change medium 328-2 with the blue laser light, which is collected by an optical component 332-2 (e.g. any suitable combination of lenses, prisms, mirrors and the like). The direction of light is indicated by the arrows in FIG. 3, and the change in colour is indicated by light emitted by colour change medium 328-2 having a longer wavelength than light irradiating colour change medium 328-2.

Each of optical components 332-1, 332-2 is further configured to convey light emitted by respective colour change mediums 328-1, 328-2 to a light combining optical component 340 configured to combine light received into combined output light.

A third light path 326-3 from beam splitter 324 comprises optical components (e.g. any suitable combination of lenses, prisms, mirrors and the like) for conveying blue laser light to light combining optical component 340 without converting the blue laser light to light of a different colour. In some implementations, third light path 326-3 can be further configured to at least partially decohere the blue laser light. In some implementations, however, third light path 326-3 can be similar to light paths 326-1, 326-2 and include a colour change medium configured to convert the blue laser light to decohered blue light and/or blue light of a wavelength different from the blue laser light.

In any event, light combining optical component 340 is generally configured to combine green light from optical component 332-1, red light from optical component 332-2, and blue light from third light path 326-3 into white light, and convey the light to output 322 via a light path 342.

It is appreciated that while a specific implementation of colour conversion system 311 is described, colour conversion system 311 can comprise any number of optical components and light paths for conveying, splitting, and combining light therein. For example, each of beam splitter 324, light paths 326-1, 326-2, 326-3, 342, optical components 330-1, 330-2, 332-1, 332-3, and light combining optical component 340 can comprise any number of optical components for performing a respective function including, but not limited to, lenses, prisms, mirrors, integrators, optical fibers and the like. In some implementations, colour conversion system 311 can comprise a colour wheel, for example for use with sequential colour projectors.

Further, light exiting output 322 can be coherent, partially coherent or decoherent. However, when the light exiting output 322 is generally decoherent, one or more of light paths 213 and projectors 207 are generally configured to decohere light to reduce speckle in projected images. However, reduction of speckle is generally optional, and indeed implementations of colour conversion system 311 that use phosphors and/or quantum dots may not result in speckle as light from phosphors and quantum dots is generally incoherent.

Colour conversion system 311 is appreciated to be an example only, and other colour conversion systems are within the scope of present implementations. For example, alternative colour conversion systems can be similar to colour conversion system 311, but comprise three outputs, similar to output 322, one for each of blue light, red light and green light; in these implementations light paths 213 can convey each of blue light, red light and green light exiting a respective colour conversion system to a respective projector, where the blue light, red light and green light are combined to form images for projection, for example in three colour and/or three light modulator projectors. Alternatively, each light path 213 can comprise one or more light combining components, similar to light combining optical component 340, configured to combine blue light, red light and green light exiting each respective output of a respective colour conversion system.

In any event, when each of the plurality of colour conversion systems 211 is similar to colour conversion system 211, each of the plurality of colour conversion systems 211 can be configured to convey a portion of the blue laser light to one or more of plurality of projectors 207 and one or more light combining components (e.g. light combining component 340) without converting the portion of the blue laser light to the at least one other colour, for combination with the at least one other colour of light for use in projecting the images. Further, each of the plurality of colour conversion systems 211 can be configured to convert the blue laser light to one or more of red light and green light; for example, in yet further implementations, system 200 can comprise first colour conversions systems for converting the blue laser light to green light and second colour conversion systems for converting the blue laser light to red light, with suitable optical components for conveying the red light and the green light to projectors 207.

However, as depicted, each of the plurality of colour conversion systems 211 can be configured to convert the blue laser light to both red light and green light. In general, each of the plurality of colour conversion systems 211 comprises at least one of a colour change medium, a phosphor and quantum dots configured to convert the blue laser light to the at least one other colour.

Figure 4:
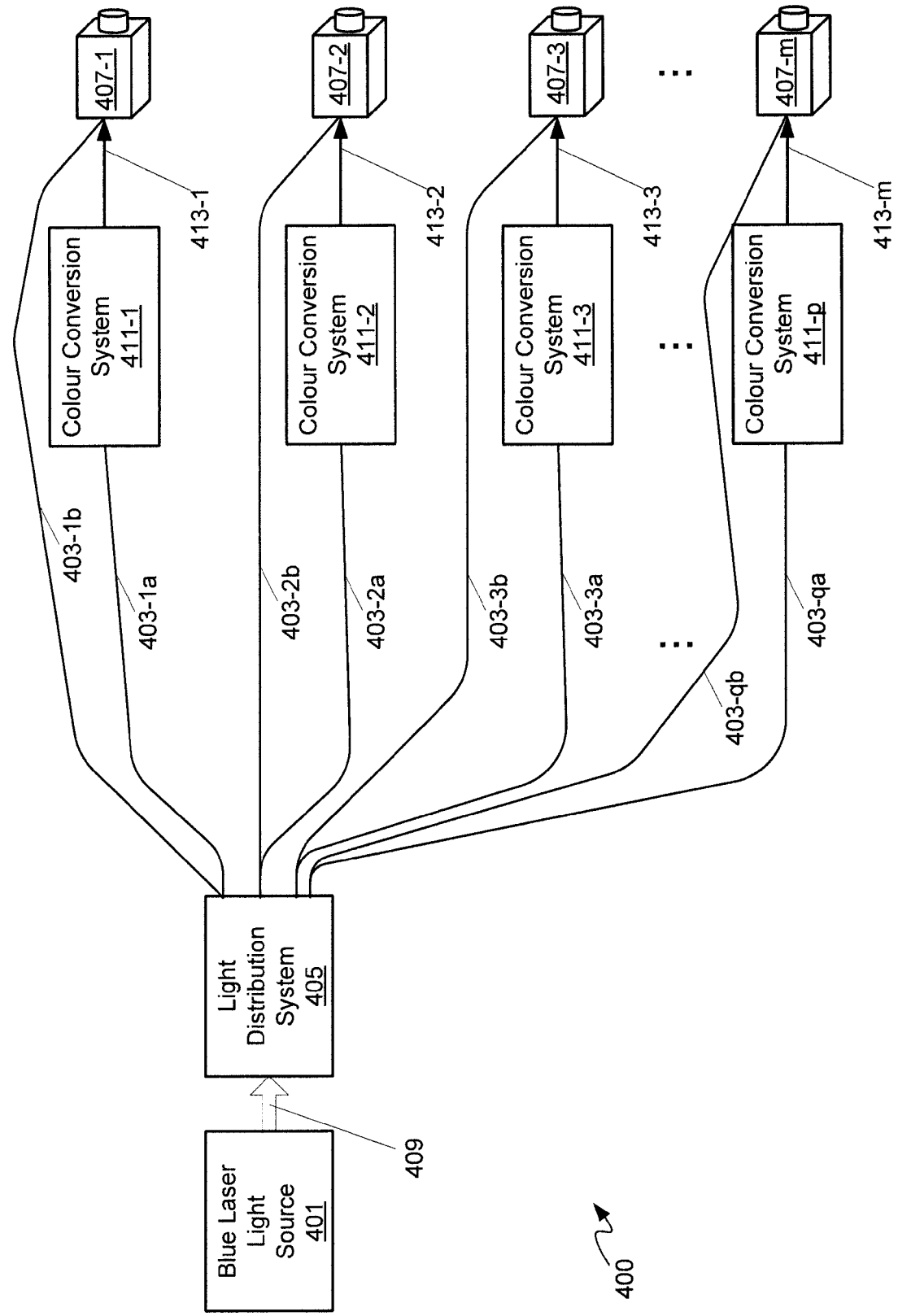
FIG. 4 depicts a system for distributing blue laser light to a plurality of projectors, according to non-limiting implementations.

However, other implementations are within the scope of present implementations. For example, attention is next directed to FIG. 4, which is substantially similar to FIG. 2, with like elements having like numbers, however preceded by a "4" rather than a "2". System 400 comprises: a blue laser light source 401; a plurality of optical fibers 403-1*a*, 403-2*a*, 403-3*a* ... 403-*qa*, 403-1*b*, 403-2*b*, 403-3*b* ... 403-*qb*; a light distribution system 405 configured to receive blue laser light from blue laser light source 401 (for example via a light path 409) and distribute the blue laser light to the plurality of optical fibers 403-1*a*, 403-2*a*, 403-3*a* ... 403-*qa*, 403-1*b*, 403-2*b*, 403-3*b* ... 403-*qb*; a plurality of colour conversion systems 411-1, 411-2, 411-3 . . . 411-*p*, each configured to: receive the blue laser light from at least one of the plurality of optical fibers 403-1*a*, 403-2*a*, 403-3*a* . . . 403-*qa*; and convert the blue laser light to at least one other colour of light different from the blue laser light; and, a plurality of projectors 407-1, 407-2, 407-3 . . . 407-*m* configured to receive the at least one other colour of light, from the plurality of colour conversion systems 411-1, 411-2, 411-3 . . . 411-*p*, for use in projecting images, for example along a respective light path 413-1, 413-2, 413-3 . . . 413-*m*. Optical fibers 403-1*b*, 403-2*b*, 403-3*b* . . . 403-*qb* are configured to convey the blue laser light to one or more of projectors 407-1, 407-2, 407-3 . . . 407-*m*.

Plurality of optical fibers 403-1*a*, 403-2*a*, 403-3*a* . . . 403-*qa*, 403-1*b*, 403-2*b*, 403-3*b* . . . 403-*qb* will be referred to hereafter, collectively, as optical fibers 403, and generically as an optical fiber 403; similarly, plurality of colour conversion systems 411-1, 411-2, 411-3 . . . 411-*p* will be referred to hereafter, collectively, as colour conversion systems 411, and generically as an colour conversion system 411; and, similarly, plurality of projectors 407-1, 407-2, 407-3 . . . 407-*m* will be referred to hereafter, collectively, as projectors 407, and generically as a projector 407. Plurality of light paths 413-1, 413-2, 413-3 . . . 413-*m* will be referred to hereafter, collectively, as light paths 413, and generically as a light path 413.

Hence, system 400 is similar to system 200, however system 400 comprises double the number of optical fibers 403 as in system 200, with optical fibers 403-1*a*, 403-2*a*, 403-3*a* . . . 403-*qa* conveying blue laser light from light distribution system 405 to respective colour conversion systems 411, and optical fibers 403-1*b*, 403-2*b*, 403-3*b* . . . 403-*qb* conveying blue laser light from light distribution system 405 to one or more of each of the plurality of projectors and one or more light combining components, for combination with the at least one other colour of light for use in projecting the images.

In other words, optical fibers 403-1*a*, 403-2*a*, 403-3*a* . . . 403-*qa* convey the blue laser light to colour conversion systems 411 where the blue laser light is converted to at least one other colour of light different from the blue laser light. Indeed, each colour conversion system 411 can be similar to colour conversion system 311, but lacking third light path 326-3. Rather, the blue laser light is conveyed to one or more of projectors 407 and light combining optical components via optical fibers 403-1*b*, 403-2*b*, 403-3*b* . . . 403-*qb* rather than via optical fibers 403-1*a*, 403-2*a*, 403-3*a* . . . 403-*qa* and light combining systems 411. The light combining optical components can be similar to light combining optical component 340 and can be located at each of projectors 407 and/or on light paths 413.

Hence, in present implementations, at least a portion of the optical fibers 403 can be configured to relay at least a portion of the blue laser light from light distribution system 405 to one or more of each of plurality of projectors 407 and one or more light combining components, for combination with the at least one other colour of light for use in projecting the images.

While system 400 reduces complexity of colour conversion systems 411, as compared to colour conversion system 311, there are more optical fibers 403 than in system 200. To reduce the number of optical fibers 403, a portion of colour conversion systems 411 can be similar to colour conversion system 311 (i.e. including third light path 326-3): for each of these colour conversion systems one of optical fibers 403-1*b*, 403-2*b*, 403-3*b* . . . 403-*qb* can be eliminated. In these implementations, another portion of colour conversion systems 411 can omit third light path 326-3, relying on an optical fiber 403 to convey the blue laser light to a projector 407 and/or a light combining optical component.

Hence, in some implementation of system 400, one or more of a portion of plurality of optical fibers 403 and plurality of colour conversion systems 411 are configured to convey at least a portion of the blue laser light to one or more of plurality of projectors 407 and one or more light combining components, without converting the portion of the blue laser light to the at least one other colour.

It is further appreciated that the present specification provides a method comprising: distributing blue laser light to a plurality of colour conversion systems 211, 311, 411 using a plurality of optical fibers 203, 403; at each of the plurality of colour conversion systems 211, 311, 411: receiving the blue laser light; and converting the blue laser light to at least one other colour of light different from the blue laser light; and, distributing the at least one other colour of light from the plurality of colour conversion systems 211, 311, 411 to a plurality of projectors 207, 407, for use in projecting images.

Using a blue laser light source 201 (and/or blue laser light source 401) has certain advantages over using a white light source. For example, only a single type of driver and a single type of thermal management system is used to power and cool blue laser light source 201, as compared to a white light source, reducing the relative complexity and bill of materials for system 200 (and/or system 400). Further, blue lasers are generally less expensive than red lasers and green lasers, which results in lower cost for the light source of system 200, as compared to a system that uses a white light source.

Further, complexity and cost of optical fibers 203 (and/or optical fibers 403) can be reduced, as compared to a system that uses a white light source. For example, each of plurality of optical fibers 203 can comprise a fiber optic patchcord, instead of optical fiber bundles, as in a white light system; fiber optic patchcords are generally less expensive than optical fiber bundles, thereby reducing cost, and can be an "off-the-shelf" product, thereby reducing complexity of system 200, as compared to a system that uses a white light source. Furthermore, blue lasers generally have a lower etendue than red lasers and green lasers; hence, each of the plurality of optical fibers 203 can comprise a core diameter smaller than a respective core diameter of optical fiber configured to convey one or more of red laser light, green laser light and white laser light. As cost of optical fiber can increase with core diameter, optical fiber configured to convey blue laser light is generally of a lower cost than optical fiber configured to convey red light, green light and/or white light; thus use of blue laser light source 201, and optical fiber patchcords having core diameter configured to convey blue laser light, reduces overall the cost of system 200.

Returning to FIGS. 1 and 2, in some implementations, light distribution systems 105, 205 can each be further configured to distribute equal intensities of light from light source(s) 101 and/or blue laser light source 201 (and/or blue laser light source 401) to each of projectors 107 and/or colour conversion systems 211.

Figure 5:
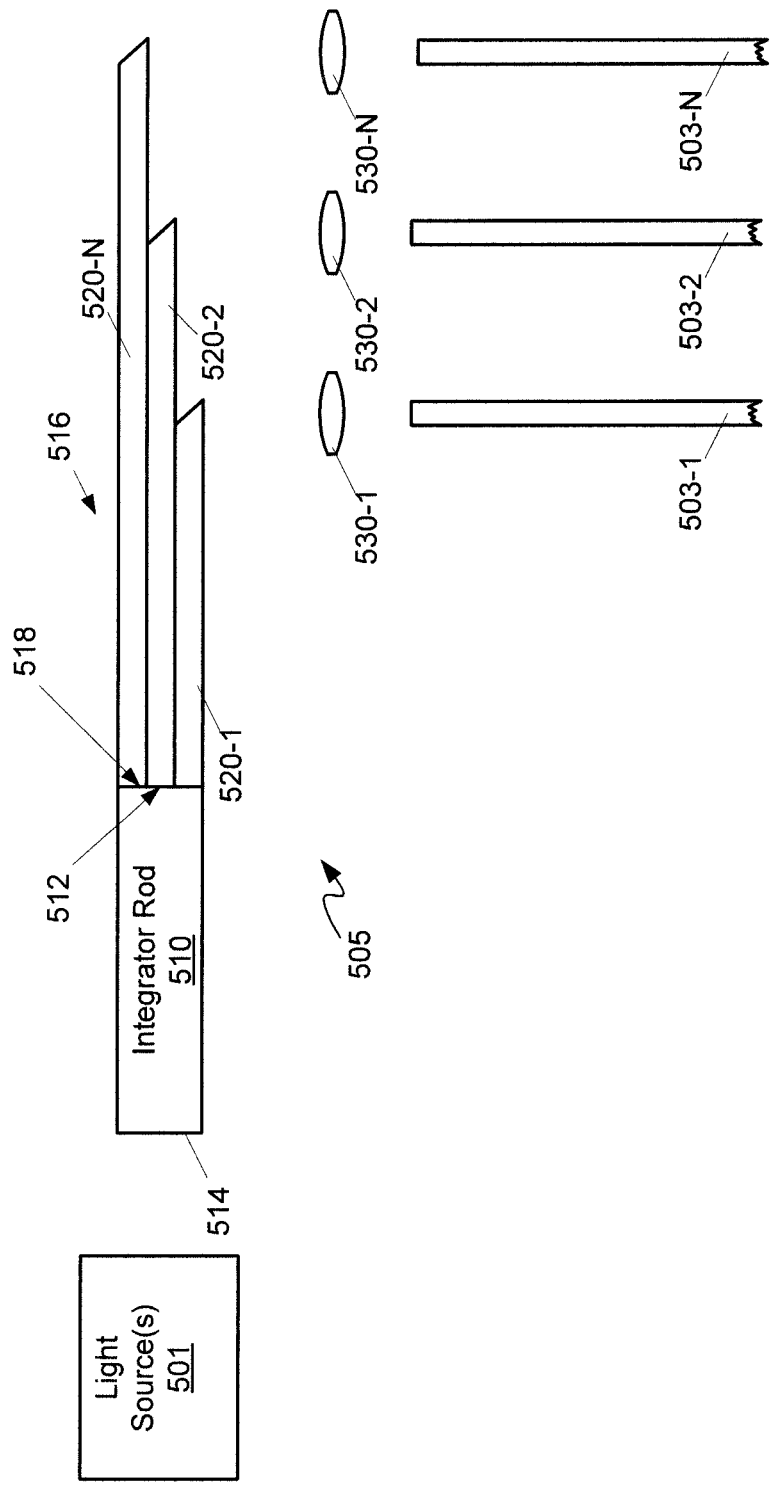
FIG. 5 depicts a light distribution system for use with the systems of FIGS. 1, 2, and 4, according to non-limiting implementations.

For example, attention is directed to FIG. 5 which depicts: a light source 501 (which can be similar to light source 101 and/or blue laser light sources 201, 401), optical fibers 503-1, 503-2 . . . 503-N (which can be similar to optical fibers 103, 203, 403) and a light distribution system 505. Optical fibers 503-1, 503-2 . . . 503-N will be interchangeably referred to hereafter, collectively, as optical fibers 503 and generically as an optical fiber 503.

Light distribution system 505 comprises: an integrating rod 510 comprising an output end 512 opposite an input end 514, integrator rod 510 configured to emit, at output end 512 an integrated image of light received at input end 514, the integrated image having an etendue $E_{img}$ and an area $A_{img}$ at a given distance from the output end; and, an apparatus 516 comprising an input side 518 located at the given distance, apparatus 516 configured to: receive, at input side 518, the integrated image from output end 512 of integrating rod 510; split the integrated image into a number N of sub-images, each of the sub-images having an area $A_{sub}$, and an etendue $E_{sub}$, such that $A_{img}$ is about $N*A_{sub}$, and $E_{img}$ is about $N*E_{sub}$; and, relay the sub-images. In some implementations, $A_{img}=N*A_{sub}$. However, in other implementations, $A_{img}$ can be larger and/or slightly larger than $N*A_{sub}$; for example, the integrated image can fill the area of input side 518 and/or be slightly larger than input side 518. In these implementations, the integrated image can be in a range of about 0.5% larger to about 10% larger. Further, the sub-images can be further relayed to projectors for use in projecting images, and etendue $E_{sub}$ of each sub-image can be matched to an etendue of a projector. Hence, once etendues for a number "N" of projectors are known, an etendue of integrating rod 510 (i.e. similar to etendue $E_{img}$ of integrated image) can be chosen based on $E_{img}$ being about $N*E_{sub}$.

Light distribution system 505, as depicted in FIG. 5, is a particular non-limiting implementation of a light distribution system configured to distribute equal intensities of light from a light source. In particular, apparatus 516 comprises: a plurality of sub-integrating rods 520-1, 520-2 . . . 520-N in a one-to-one relationship with the number N of the sub-images, each of the plurality of sub-integrating rods 520-1, 520-2 . . . 520-N configured to form a respective one of the sub-images, the plurality of sub-integrating rods 520-1, 520-2 . . . 520-N comprising respective inputs (see FIG. 6) adjacent to one another located at the given distance, forming input side 518 of apparatus 516, the respective inputs adjacent output end 512 of integrator rod 510, a total area of the respective inputs and an output area of the output end each similar to the area $A_{img}$ of the integrated image.

The plurality of sub-integrating rods 520-1, 520-2 . . . 520-N will be interchangeably referred to hereafter, collectively, as sub-integrating rods 520, and generically as a sub-integrating rod 520.

Figure 6:
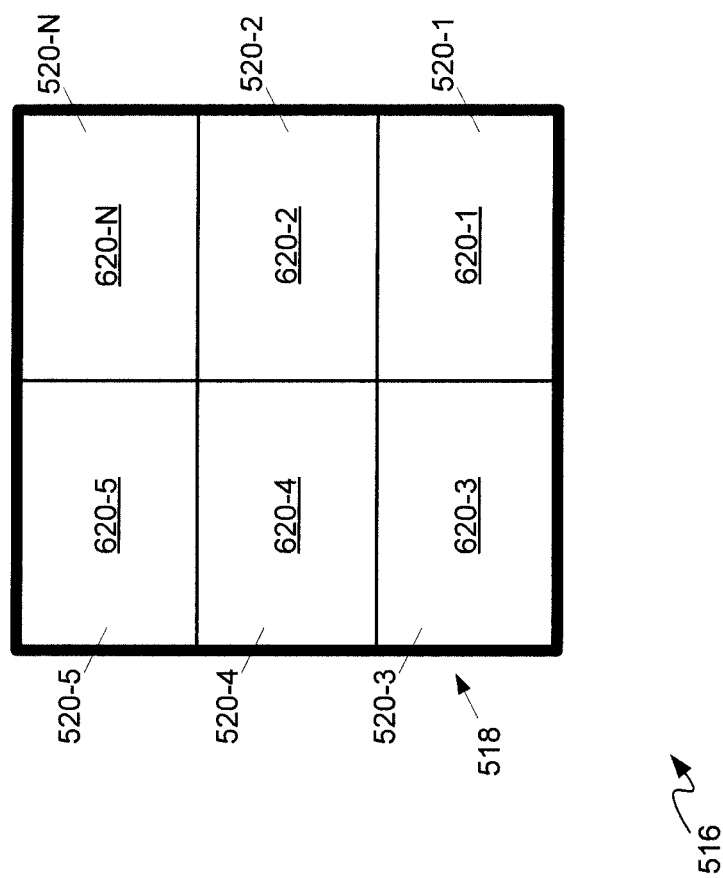
FIG. 6 depicts an end view of an apparatus from FIG. 5, the apparatus for equally distributing light, to a plurality of projectors, according to non-limiting implementations.

Attention is next directed to FIG. 6 which depicts an end view of apparatus 516, and in particular a view of input side 518, such that respective inputs 620-1, 620-2, 620-3, 620-4, 620-5, 620-N of each sub-integrating rod 520 are also depicted. Respective inputs 620-1, 620-2, 620-3, 620-4, 620-5, 620-N will interchangeably referred to hereafter, collectively, as respective inputs 620 and, generically, as a respective input 620. From FIG. 6, it is apparent that, in depicted implementations, apparatus 516 comprises six (6) sub-integrating rods 520-1, 520-2, 520-3, 520-4, 520-5, 520-N, such that N=6. It is yet further apparent that each respective input 620 is of an equal area $A_{img}$, such that a respective area of each of respective inputs 620 are all about equal to one another. Further, the total area of respective inputs 620 forms the area of input side 518, which is about equal to an area of output end 512.

Hence, the integrated image formed by integrating rod 510 exits output end 512 and enters input side 518 of sub-integrating rods 520; in particular a portion of the integrated image enters each of the number N of sub-integrating rods 520; as a respective input 620 of each of the sub-integrating rods 520 are about equal in area, the integrating image is divided into a number N of sub-images, and each sub-integrating rod 520 further integrates each respective sub-image.

While apparatus 516 is depicted in FIG. 6 comprises six sub-integrating rods 520, apparatus 516 can comprise any suitable number of integrating rods 520, where respective inputs 620 all have a similar area and the total area of respective inputs 620 is about the same as the area of output end 512 of integrating rod 510. Further, a shape of input side 518 is the same as a shape of output end 512; further the perimeters of each of input side 518 and output end 512 are in alignment.

Returning to FIG. 5, it is yet further apparent that the given distance at which input side 518 is located from output end 512 is about 0 cm, such that $A_{img}=N*A_{sub}$, as input side 518 and output 512 are butted against each other. However, in other implementations, there can be a gap between input side 518 and output end 512 such that $A_{img}>N*A_{sub}$; this can, however, lead to a loss in efficiency as light from the integrated image that spills beyond input side 518 is generally lost; on the other hand, such a gap can ensure that the integrated image fills input side 518 with light, in case of misalignment between output end 512 and input side 518. Hence, there can be a trade-off between a gap between output end 512 and input side 518, loss of light, and precision of alignment between output end 512 and input side 518.

In any event, as depicted, the integrated image is formed at respective inputs 620 of plurality of integrating rods 520, and divided into a number N of sub-images.

In addition, a respective etendue $E_{rod}$ of each of sub-integrating rods 520 is about equal to the etendue $E_{sub}$ of the sub-images and/or the etendue $E_{img}$ of the integrated image is about equal to $N*E_{rod}$ and/or an etendue $E_{int}$ of integrating rod 510 is about equal to $N*E_{rod}$, presuming etendue $E_{int}$ is about equal to etendue $E_{img}$. In other words, the etendue $E_{rod}$ of sub-integrating rods 520 is chosen to be about $E_{int}/N$.

Further, as described above, the sub-images can be further relayed to projectors for use in projecting images, and etendue $E_{rod}$ of each sub-integrating rod 520 can be matched to an etendue of a projector. Hence, once etendues for a number "N" of projectors are known, an etendue of each sub-integrating rod 520 can be chosen and, in turn an etendue of integrating rod 510 (i.e. similar to etendue $E_{img}$ of integrated image) can be chosen based on $E_{img}$ being about $N*E_{sub}$ and/or $N*E_{rod}$.

Each of respective inputs 620 are further adjacent to one another, and fill the area of output end 512, which ensures that little to no light from integrated image is lost. Put another way, respective inputs 620 of plurality of sub-integrating rods 520 are stacked. While, respective inputs 620 are stacked, to ensure efficient collection of light from the integrated image, in some implementations, integrating rods 520 can be flexible, and the remainder of integrating rods 520 need not be stacked, other than at respective inputs 620. Further, in these, implementations, flexible integrating rods 520 can be configured so that the output ends are positioned to align with relay lenses, colour correction system inputs, projector inputs, and the like.

However, as depicted plurality of sub-integrating rods 520 are stacked such that respective longitudinal axes of plurality of sub-integrating rods 520 are generally parallel. For example, such a configuration can be implemented when plurality of sub-integrating rods 520 are rigid (e.g. made from glass, plastic, and the like). In these implementations, at least a portion of plurality of sub-integrating rods 520 can be of different lengths, and a respective output of each of the plurality of sub-integrating rods 520 are configured to relay a respective sub-image to a different respective position. For example, as depicted, each output of each sub-integrating rod comprises a prism that is configured to receive a respective sub-image and relay the sub-image by about 90°.

Specifically, as depicted, the system depicted in FIG. 5 further comprises a plurality of relay lenses 530-1, 530-2 . . .

530-N, in a one-to-one relationship with plurality of sub-integrating rods 520, each of the plurality of relay lenses 530-1, 530-2 ... 530-N located at one of the different respective positions, each of the plurality of relay lenses 530-1, 530-2 ... 530-N configured to further relay a respective sub-image.

Plurality of relay lenses 530-1, 530-2 ... 530-N will interchangeably referred to hereafter as, collectively, relay lenses 530 and, generically, as a relay lens 530. In any event the system in FIG. 5 further comprises a plurality of optical fibers 503, in a one-to-one relationship with plurality of relay lenses 530, each of the plurality of optical fibers configured to receive the respective sub-image relayed by a respective relay lens 530, each of optical fibers 503 configured to relay a respective sub-image to, for example, a projector and/or a colour correction system (not depicted), as described above.

Figure 7:
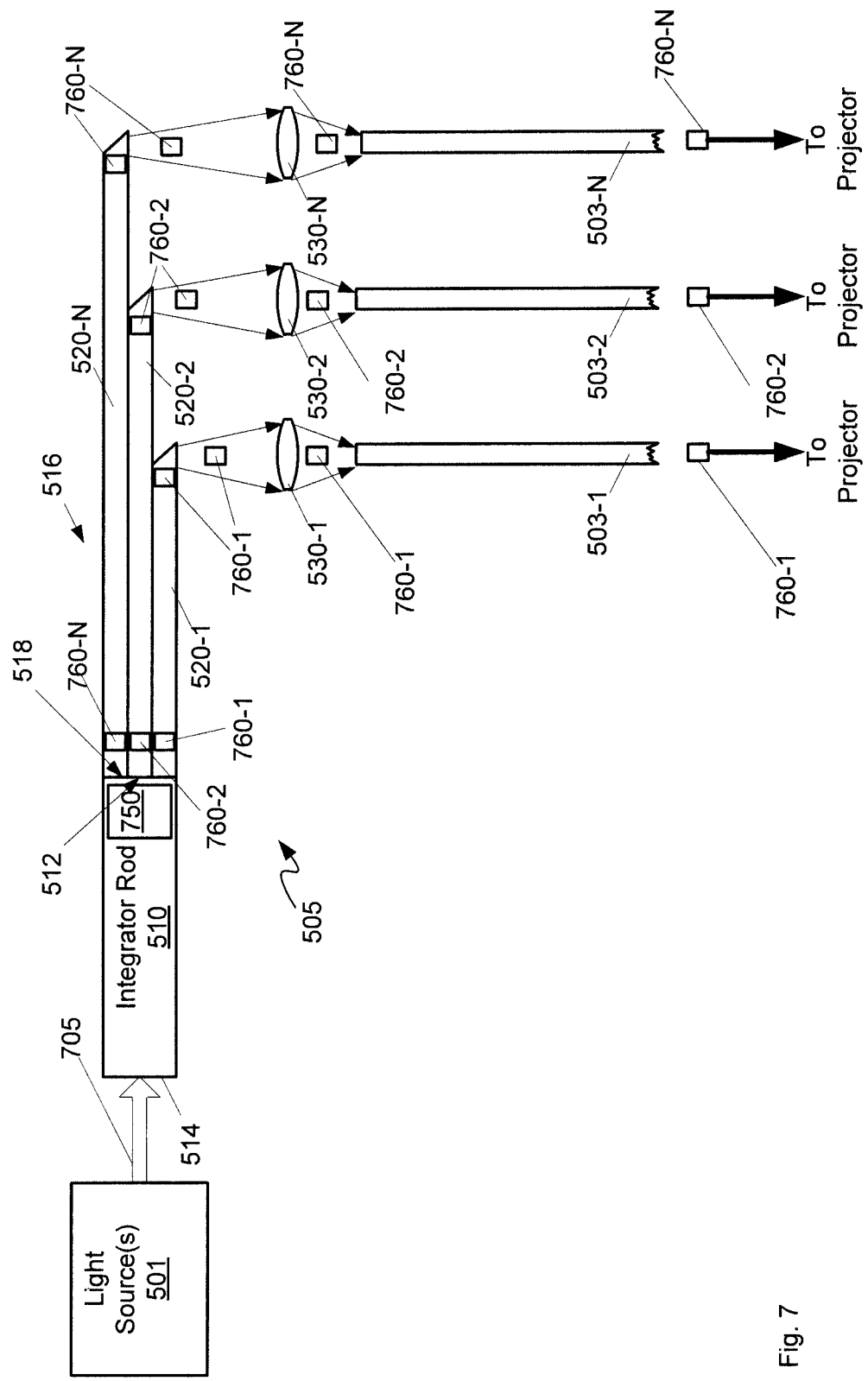
FIG. 7 depicts the system of FIG. 5 in operation, according to non-limiting implementations.

Attention is next directed to FIG. 7, which is substantially similar to FIG. 5, with like elements having like numbers. Specifically, FIG. 7 depicts the elements of FIG. 5 in operation. Light source 501 emits light 705 which is received at input end 514 of integrating rod 510. Integrating rod 510 integrates light 705 to form an integrated image 750 at output end 512; while elements of FIG. 7 are generally depicted in a schematic side view, integrated image 750 is shown in a plan view for illustration purposes. As input side 518 and output end 512 are adjacent to one another, and have the same area as integrated image, and as perimeters of each of input side 518 and output end 512 are in alignment, integrated image 750 is split into a number "N" of sub-images 760-1, 760-2, 760-3, one sub-image 760-1, 760-2, 760-3 for each sub-integrating rod 520. Sub-images 760-1, 760-2 ... 760-N will interchangeably referred to hereafter as, collectively, sub-images 760 and, generically, as a sub-image 760.

In any event, each respective sub-image 760 is further integrated by each respective integrating rod 520 and, when each respective sub-image 760 reaches a respective output (e.g. a prism), each respective output relays the respective sub-image 760 to a respective relay lens 530, which in turn relays the respective sub-image 760 to a respective optical fiber 503. Each respective optical fiber 503 relays a respective sub-image 760 to, for example, a projector and/or a colour correction system (not depicted), as described above. Further, similar to integrated image 750, sub-images 760 are shown in a plan view for illustration purposes.

While each respective sub-image 760 is depicted as not changing size as it is relayed through the system of FIG. 7, it is appreciated that sub-images 760 can change in size, for example, between outputs of sub-integrating rods 520 and relay lenses 530, and between relay lenses 530 and optical fibers 503. However, the etendue of sub-images 760 generally remain the same.

While FIGS. 5 to 7 depict a particular non-limiting apparatus 516, based on sub-integrating rods 520, for distributing equal intensities of light from a light source, other implementations are within the scope of the present specification.

Figure 8:
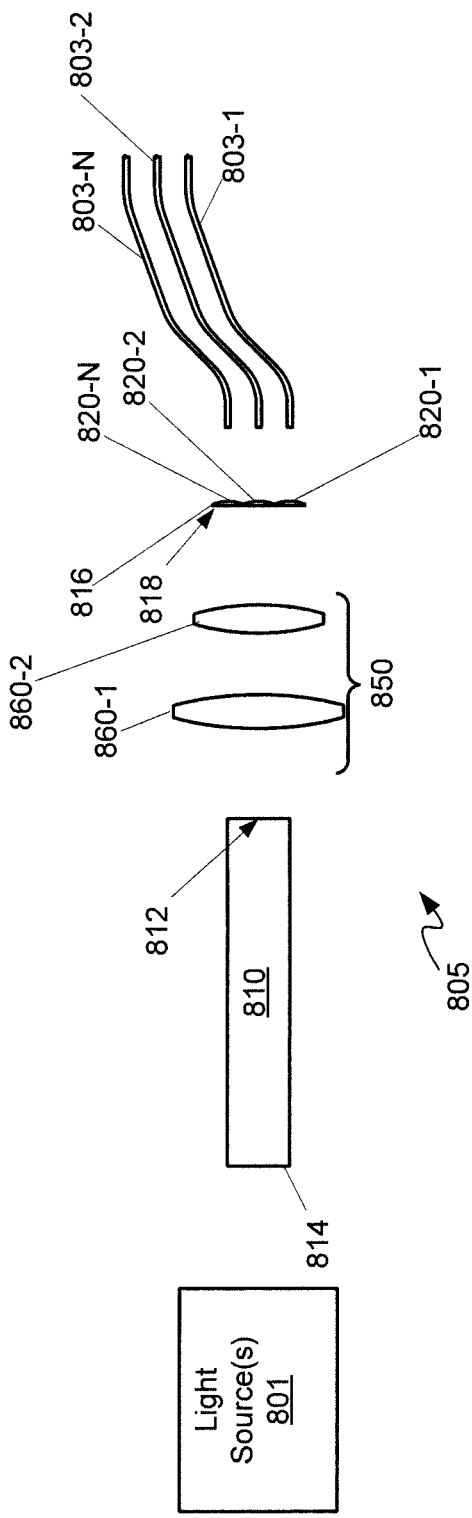
FIG. 8 depicts an alternative light distribution system for use with the systems of FIGS. 1, 2, and 4, according to non-limiting implementations.

For example, attention is directed to FIG. 8 which depicts: a light source 801 (which can be similar to light source 101 and/or blue laser light sources 201, 401), optical fibers 803-1, 803-2 ... 803-N (which can be similar to optical fibers 103, 203, 403, 503) and a light distribution system 805. Optical fibers 803-1, 803-2 ... 803-N will be referred to hereafter, collectively, as optical fibers 803 and generically as an optical fiber 803.

Light distribution system 805 comprises: an integrating rod 810 comprising an output end 812 opposite an input end 814, integrator rod 810 configured to emit, at output end 812 an integrated image of light received at input end 814, the integrated image having an etendue $E_{img}$ and an area $A_{img}$ at a given distance from the output end; and, an apparatus 816 comprising an input side 818 located at the given distance, apparatus 816 configured to: receive, at input side 818, the integrated image from output end 812 of integrating rod 810; split the integrated image into a number N of sub-images, each of the sub-images having an area $A_{sub}$, and an etendue $E_{sub}$, such that $A_{img}$ is about $N*A_{sub}$, and $E_{img}$ is about $N*E_{sub}$; and, relay the sub-images. In some implementations, $A_{img}=N*A_{sub}$. However, in other implementations, $A_{img}$ can be larger and/or slightly larger than $N*A_{sub}$; for example, the integrated image can fill the area of input side 818 and/or be slightly larger than input side 818. In these implementations, the integrated image can be in a range of about 0.5% larger to about 10% larger.

Light distribution system 805, as depicted in FIG. 8, is a particular non-limiting implementation of a light distribution system configured to distribute equal intensities of light from a light source.

Apparatus 816 comprises an array of lenslets 820-1, 820-2, ... 820-N in a one-to-one relationship with the number N of the sub-images. Lenslets 820-1, 820-2, ... 820-N are interchangeably referred to hereafter, collectively, as lenslets 820 and, generically, as a lenslet 820.

Each of lenslets 820 are configured to form a respective one of the sub-images. Further, the array of lenslets 820 comprise respective inputs adjacent to one another at the given distance, forming input side 818 of apparatus 816, as described in further detail below, with respect to FIG. 9.

The system of FIG. 8 further comprises a telecentric relay system 850 located between output end 812 of integrating rod 810 and the array of lenslets 820, telecentric relay system 850 configured to relay the integrated image to the respective inputs of the array of lenslets 820; a total area of the respective inputs is about the area $A_{img}$ of the integrated image at the given distance. Telecentric relay system 850 generally comprises a first lens 860-1 and a second lens 860-2, but can comprise any number of lenses.

Figure 9:
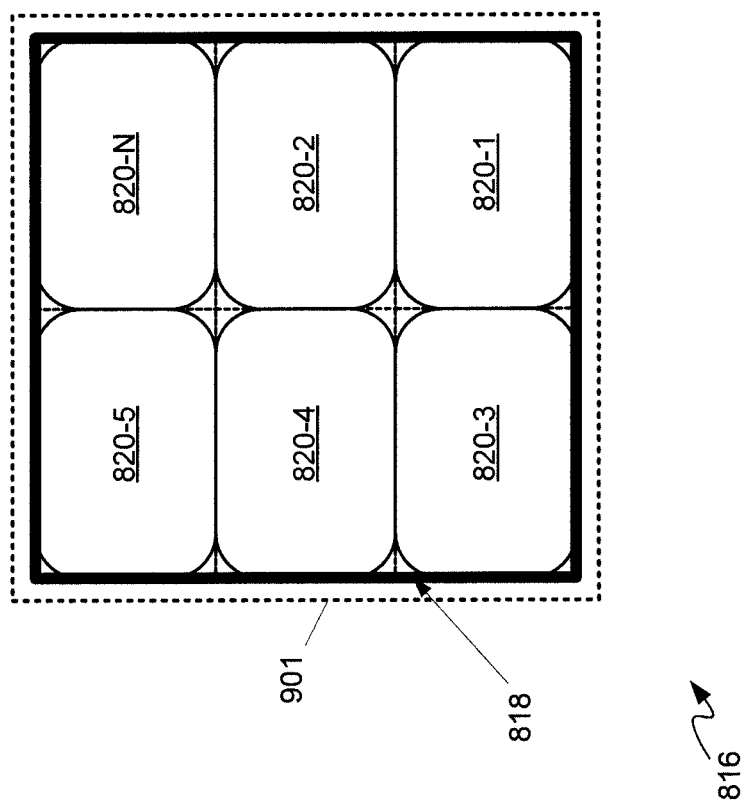
FIG. 9 depicts an end view of an apparatus from FIG. 8, the apparatus for equally distributing light, to a plurality of projectors, according to non-limiting implementations.

Attention is next directed to FIG. 9, which depicts a plan view of apparatus 816, and in particular array of lenslets 820 from input side 818. In these implementations apparatus 816 comprises six (6) lenslets 820-1, 820-2, 820-3, 820-4, 820-5, 820-N, where N=6. However, while apparatus 816 is depicted in FIG. 9 comprises an array of six lenslets 820, apparatus 816 can comprise any suitable number of lenslets 820, where respective inputs all have a similar area and the total area is about the same as the area $A_{img}$ of the integrated image at the given position. In other words, in these implementations, the given position and input side 818 are coincident, as described in further detail below.

FIG. 9 further depicts integrated image 901 at input side 818 of the array of lenslets 820, showing that integrated image 901 can be slightly larger than input side 818, for example in a range of about 0.5% to about 10% larger. Hence, the total area of the respective inputs is less than the area $A_{img}$ of the integrated image at the given distance. However, in other implementations, input side 818 and integrated image 901 can be about the same area.

Further, a shape of input side 818 is the same as a shape of integrated image 901 and/or output end 812; further the perimeters of each of input side 818 and integrated image 901 are generally parallel, and/or perimeters of each of input side 818 and output end 812 are generally parallel.

Each lenslet 820 comprises a lens for collecting light from integrated image 901. Indeed, the term "lenslet" simply means a small lens. Generally the term lenslet is used with respect to an array of lenslets and/or a lenslet array. A lenslet array generally comprises a set of lenslets (and/or lenses) in the same plane. Each lenslet further can generally have the same focal length.

A respective input for each lenslet 820 comprises an area $A_{lenslet}$ that is about an area of the array $A_{Array}/N$. In other words, each lenslet 820 is configured to collect light of an Nth portion of light impinging on input side 818 of the array of lenslet 820. As lenslets 820 are adjacent to one another, the array of lenslets 820 are configured to efficiently collect all light of integrated image 901, other than light that spills around array of lenslets 820.

Further, the array of lenslets 820 can comprise an integrated structure, being formed from an integrated piece of optical material, such as glass, plastic and the like; alternatively, the array of lenslets 820 can comprise individual separate lenslets 820 that are arranged in a frame and/or with optical epoxy and the like.

While respective inputs for each lenslet 820 are not labelled in FIG. 9, it is appreciated that each respective input corresponds to a portion of input side 818 where a respective lenslet 820 located.

In any event, integrated image 901 formed by integrating rod 810 exits output end 812, and is relayed to the array of lenslets 820 by telecentric relay system 850; telecentric relay system 850 can magnify integrated image 901 so that integrated image 901 is larger or smaller than an area of output end 812, when integrated image 901 impinges on input side 818 at the given position. Integrated image 901 (and/or most of integrated image 901) enters input side 818 of the array of lenslets 820; in particular a portion of integrated image 901 enters each of the number N of lenslets 820; as a respective input of each of lenslets 820 are about equal in area, integrating image 901 is divided into a number N of sub-images. Each lenslet 820 is further configured to focus a respective sub-image onto an input end of a respective optical fiber 503, as depicted in FIG. 10, described below.

Figure 10:
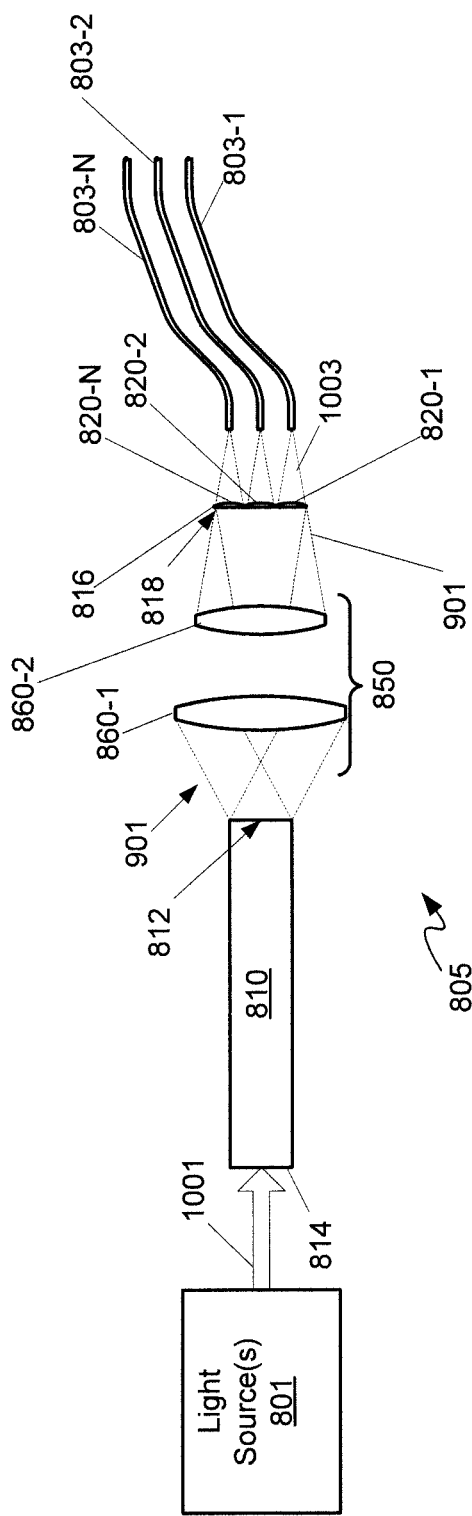
FIG. 10 depicts the system of FIG. 8 in operation, according to non-limiting implementations.

Attention is next directed to FIG. 10, which is substantially similar to FIG. 8, with like elements having like numbers. In particular, FIG. 10 depicts light 1001 emitted from light source 801 entering input end 814 of integrating rod 810, and light rays forming image 901 as integrated image 901 exits output end 812 of integrating rod. Integrated image 901 is relayed to apparatus 816 by telecentric relay system 850; telecentric relay system 850 can be configured to magnify integrated image 901 to one of increase or decrease the area $A_{img}$ of integrated image 901 at the given distance, as compared to an area of integrated image 901 as it exits integrating rod 810. Alternatively, telecentric relay system 850 does not change the area of integrated image 901.

In any event, integrated image 901 is generally formed, by telecentric relay system 850, at the respective inputs of lenslets 820. As such, output end 812 of integrating rod 810 located at an image position of telecentric relay system 850, and respective inputs of the array of lenslets 820 are located at an image position of telecentric relay system 850, coincident with the given distance. Each lenslet 820 then relays a respective sub-image 1003 of integrated image 901 to a respective optical fiber 503, though only one sub-image 1003 is labelled in FIG. 10 for clarity.

A respective etendue $E_{lenslet}$ of each of lenslets 820 is about equal to an etendue $E_{sub}$ of sub-images 1003, each of which are about equal to $E_{img}/N$, as described above. Each of the plurality of optical fibers 803 has an etendue $E_{fiber}$ that is about equal to the etendue $E_{sub}$ of sub-images 1003.

Further, as described above, the sub-images can be further relayed to projectors for use in projecting images, and etendue $E_{lenslet}$ of each lenslet 820 can be matched to an etendue of a projector. Hence, once etendues for a number "N" of projectors are known, an etendue of each lenslet 820 can be chosen and, in turn an etendue of integrating rod 810 (i.e. similar to etendue $E_{img}$ of integrated image) can be chosen based on $E_{img}$ being about $N*E_{sub}$ and/or N*Elenslet.

It is further appreciated that the plurality of optical fibers 803 are in a one-to-one relationship with the array of lenslets 820, and each of the plurality of optical fibers 803 is configured to receive and relay a respective sub-image 1003 relayed by a respective lenslet 820.

$N*E_{sub}$ and/or N*Elenslet.

It is further appreciated that the plurality of optical fibers 803 are in a one-to-one relationship with the array of lenslets 820, and each of the plurality of optical fibers 803 is configured to receive and relay a respective sub-image 1003 relayed by a respective lenslet 820.

The present specification hence further provides a method comprising: receiving an integrated image from an output end 512, 812 of an integrating rod 510, 810; splitting the integrated image into a number N of sub-images, each of the sub-images having an area $A_{sub}$, and an etendue $E_{sub}$, such that an area $A_{img}$ of the integrated image at a given distance from output end 512, 812, where the integrated image is received, is about $N*A_{sub}$, and an etendue of the given image $E_{img}$ is about $N*E_{sub}$; and, relaying the sub-images (for example to a plurality of projectors).

Figure 11:
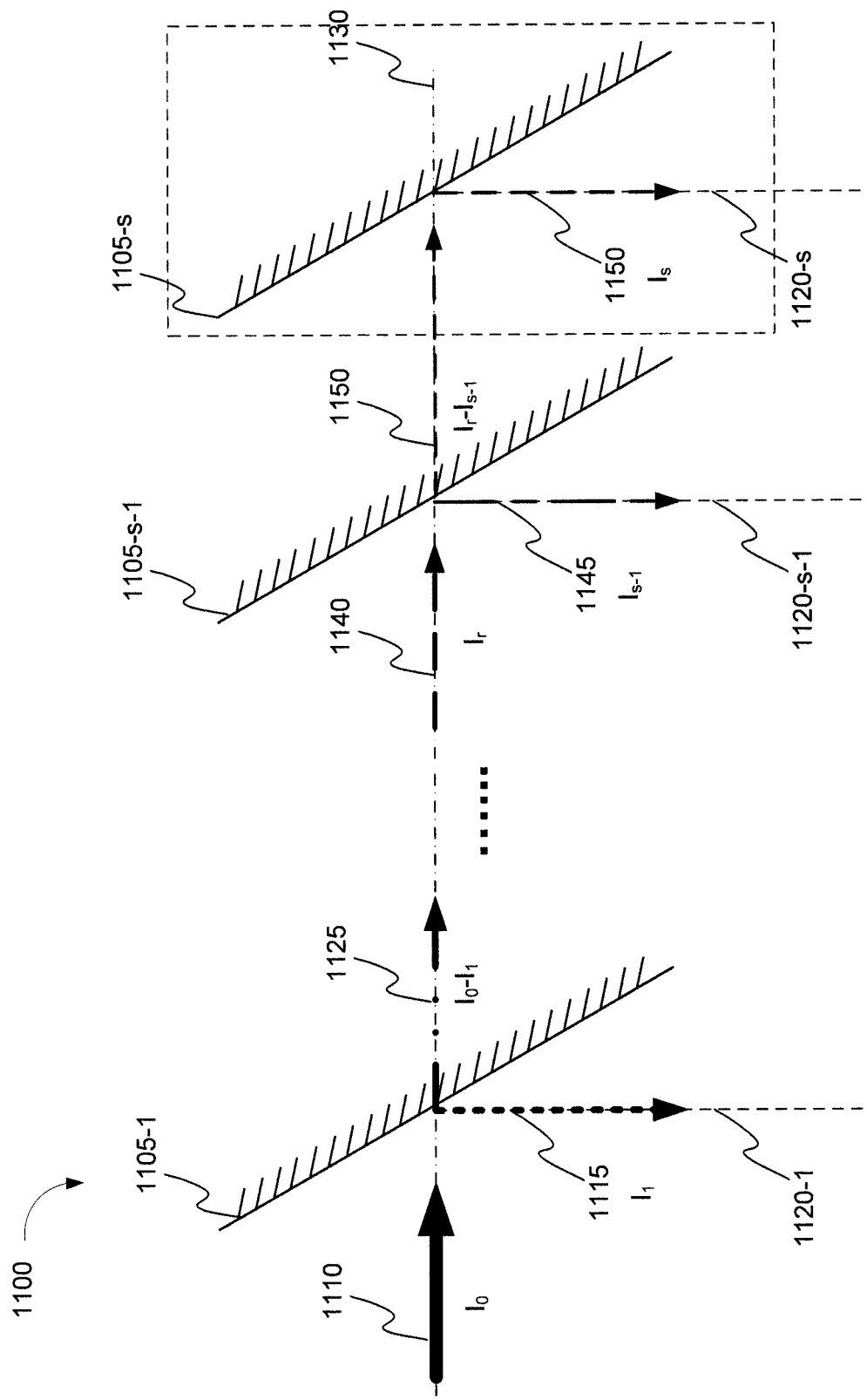
FIG. 11 depicts a system for distributing and tuning the intensity of light provided along multiple light paths, according to non-limiting implementations.

Attention is next directed to FIG. 11, which depicts system 1100 for distributing and tuning the intensity ("brightness") of light provided along multiple light paths, according to non-limiting implementations. System 1100 comprises a plurality of reflective optical devices 1105-1 . . . 1105-s-1 and 1105-s, also referred to herein as, collectively, plurality of reflective optical devices 1105 and, generically, as a reflective optical device 1105. Plurality of reflective optical devices 1105 comprises first variable reflective beam splitter 1105-1 configured to receive light 1110, having intensity $I_0$, along an input light path, such as light path 1130, and direct a portion of light 1110 as first portion 1115, having intensity $I_1$, along a first light path 1120-1 and a second portion of light 1110, as second portion 1125, having intensity $I_0-I_1$, to another one of the plurality of reflective optical devices 1105, which can be downstream of first variable reflective beam splitter 1105-1. According to the implementation shown, second portion 1125 continues along light path 1130 to another one of the plurality of reflective optical devices 1105. It is understood that substantially all of received light 1110 is directed by first variable beam splitter 1105-1 in the direction of first portion 1115 and/or in the direction of second portion 1125; in other words, each reflective optical device 1105 is configured to minimize absorption of light. According to some implementations, light exiting system 1100, such as first portion 1115, is relayed to one or more projectors as discussed below with reference to system 1700 of FIG. 17.

At each one of the plurality of reflective optical devices 1105, except the last reflective optical device 1105-s, portions of the light received by the respective reflective optical device are directed along two different light paths. For example, second last reflective optical device 1105-s-1 is configured to receive portion of light 1140, having intensity $I_r$, from a previous one of the reflective optical devices 1105 and direct portion of light 1145 along light path 1120-s-1, at intensity $I_{s-1}$, and direct portion of light 1150, having intensity $I_r-I_{s-1}$, also referred to herein as remaining light 1150, to last reflective optical device 1105-s.

According to the implementation depicted in FIG. 11, last reflective optical device 1105-s is configured to receive remaining light 1150 and direct remaining light 1150, having intensity $I_s$ (equivalent to $I_r-I_{s-1}$ in this example implementation), along light path 1120-s. According to some implementations, last reflective optical device 1105-s is configured to reflect substantially all of remaining light 1150 along light path 1120-s. According to some related implementations, last reflective optical device 1105-s comprises a mirror. However, according to some implementations, last reflective optical device 1105-s is configured to receive remaining light 1150, divide remaining light 1150 into two portions and direct the two portions of remaining light 1150 along two different light paths.

Figure 12:
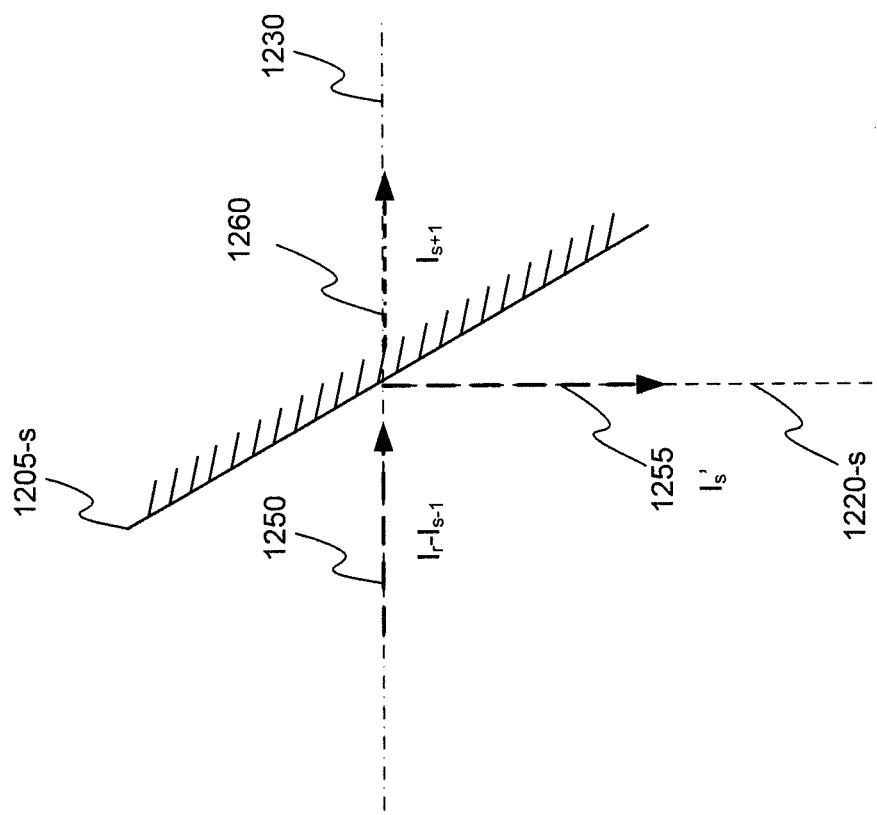
FIG. 12 depicts a second reflective optical device, according to non-limiting implementations.

Attention is directed to FIG. 12, which depicts last reflective optical device 1205-s, according to non-limiting implementations and comprising elements similar to FIG. 11 and with like elements having like numbers, however starting with a "12" rather than an "11". Last reflective optical device 1205-s is configured to receive remaining light 1250, having intensity and divide remaining light 1250 into two portions, 1255 and 1260, and direct portion 1255, having intensity $I_s'$, along light path 1220-s and portion 1260 along light path 1230 at intensity $I_{s+1}$.

As further discussed below, at least one optical property of one or more of the reflective optical devices 1105 is adjustable to variably apportion received light. Hence, according to some implementations, last reflective optical element 1105-s could be configured to variably adjust an associated reflectivity such that, like last reflective optical element 1205-s, the remaining light 1150 is divided into two portions and directed along light paths 1120-s and 1130. As a result, according to some implementations, last reflective optical devices 1205-s can be substituted for last reflective optical devices 1105-s in system 1100.

In other words, last reflective optical devices 1105-s and 1205-s can be configured to perform one of: (1) direct remaining light 1150 along a last light path 1120-s, and (2) divide remaining light 1250 into two portions, 1255 and 1260, and direct the two portions 1255, 1260 along two different light paths, such as light paths 1220-s and 1230.

Furthermore, although second last reflective optical device 1105-s−1 is depicted as a separate reflective optical device from first variable reflective beam splitter 1105-1 and last reflective optical device 1105-s, according to some implementations, system 1100 could comprise only first variable reflective beam splitter 1105-1 and last reflective optical device 1105-s such that "s" is equal to two. Hence, according to those implementations, second last reflective optical device 1105-s−1 comprises first variable reflective beam splitter 1105-1 and remaining light 1150 comprises second portion 1125.

Although all of the plurality of reflective optical devices 1105 in system 1100 are depicted as being located along light path 1130, any arrangement of the plurality of reflective optical devices 1105 in which the plurality of reflective optical devices 1105 are capable of receiving and directing light in the manner described herein is contemplated.

It is understood that each one of the plurality of reflective optical devices 1105 is configured to reflect and/or direct and/or divide and/or apportion and/or transmit substantially all of the light received at a respective reflective optical device 1105. For example, first variable reflective beam splitter 1105-1 is configured to direct substantially all of received light 1110 onto light paths 1120-1 and 1130 as first portion 1115 and second portion 1125, respectively. As a result, light losses across system 1100 can be minimized and, according to some implementations, eliminated. This is in contrast to other light distribution and light intensity tuning systems in which light intensity is adjusted by transmitting or providing only the received light necessary to produce the desired intensity and dumping the remaining light.

Furthermore, each one the plurality of reflective optical devices 1105 comprises any reflective optical component capable of directing, dividing, splitting or apportioning light received at that respective reflective optical component. According to some implementations, reflective optical devices 1105 are configured to receive light and direct, divide, split or apportion the received light to output light at a reduced or modified intensity in comparison to the received light without changing a hue or wavelength of the received light.

For example, according to some implementations, at least one of the plurality of reflective optical devices 1105 comprises one or more of: a variable reflective neutral density filter and a digital micromirror device (DMD). Depending on the type of reflective optical devices being utilized, the directing or dividing of received light comprises one or more of reflection and transmission. For example, if first variable reflective beam splitter 1105-1 comprises a variable reflective neutral density filter, then first portion 1115 can be directed along first light path 1120-1 by reflection and second portion 1125 can be directed along light path 1130 by transmission.

As another example, if first variable reflective beam splitter 1105-1 comprises a DMD, then first portion 1115 can be directed along first light path 1120-1 by tilting one or more mirrors of the DMD to reflect first portion 1115 along first light path 1120-1 and second portion 1125 can be directed along light path 1130 by tilting one or more mirrors of the DMD to reflect second portion 1125 along light path 1130. According these implementations, light paths 1120-1 to 1120-s are not necessarily parallel and light travelling between the plurality of reflective optical devices 1105 does not necessarily follow the same light path, as depicted in FIG. 11 in respective of light path 1130. An example implementation in which one or more of the plurality of reflective optical devices 1105 comprise DMDs is described below in reference to FIG. 20.

Likewise, according to some implementations, depending on the type reflective optical devices used, the last reflective optical device 1105-s and 1205-s is configured to perform the one or more of direct and divide the remaining light 1150, 1250 by one or more of reflection and transmission. For example, if last reflective optical device 1205-s comprises a variable reflective neutral density filter, then portion 1255 of remaining light 1250 can be directed along light path 1220-s by reflection and portion 1260 can be directed along light path 1230 by transmission. As another example, if last reflective optical device 1205-s comprises a DMD, then portion 1255 of remaining light 1250 can be directed along light path 1220-s by tilting one or more mirrors of the DMD to reflect portion 1255 along light path 1220-s and portion 1260 can be directed along light path 1230 by tilting one or more mirrors of the DMD to reflect portion 1260 along light path 1230.

Figure 20:
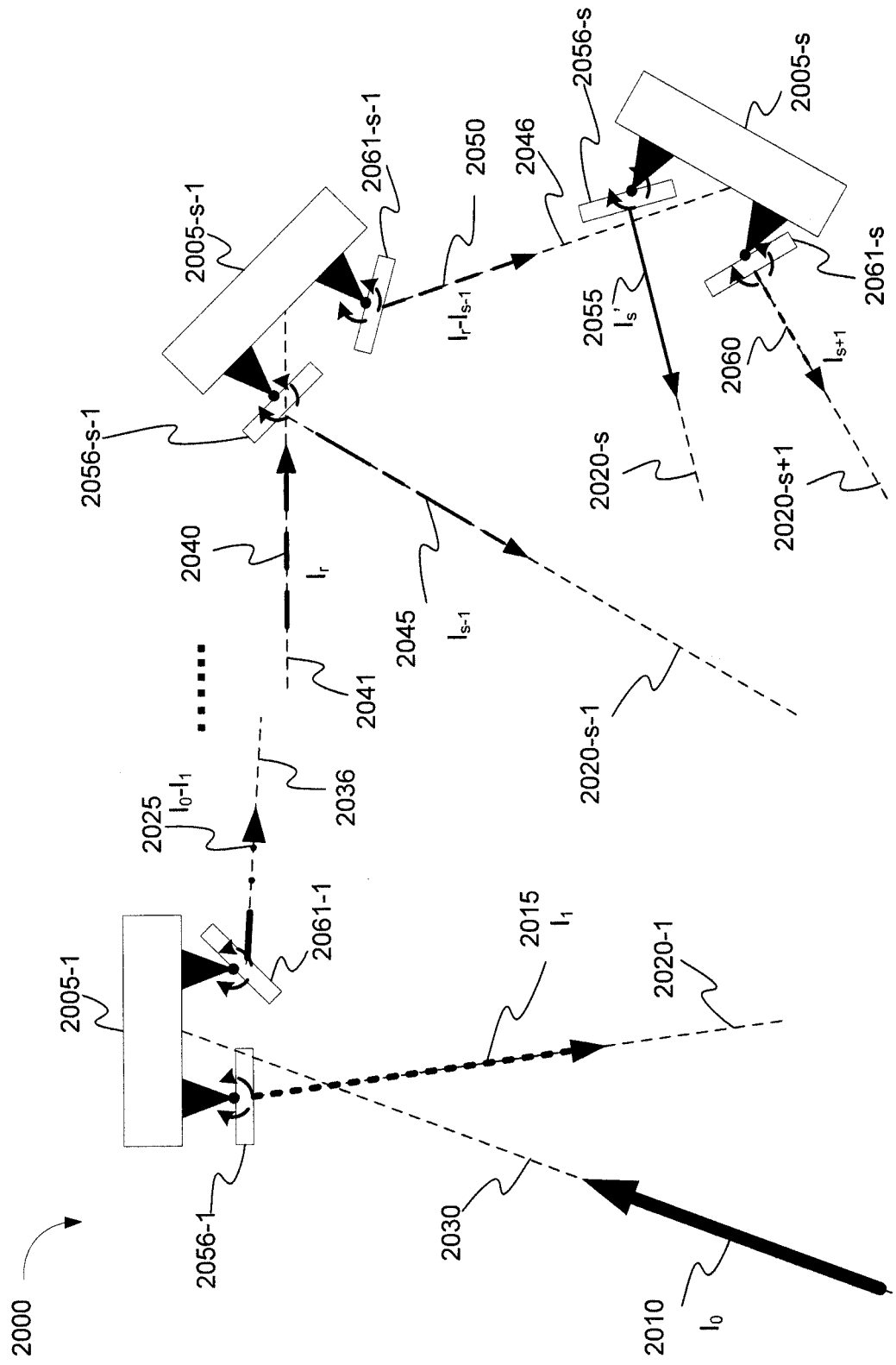
FIG. 20 depicts a system for distributing and tuning the intensity of light provided along multiple light paths in which one or more of the plurality of reflective optical elements comprises digital micromirror devices (DMD), according to non-limiting implementations.

For better understanding of implementations using DMDs, attention is directed to FIG. 20, which depicts system 2000 for distributing and tuning the intensity ("brightness") of light provided along multiple light paths, according to non-limiting implementations. System 2000 comprises, elements similar to FIGS. 11 and 12, with like elements having like numbers, however starting with a "20" rather than an "11" or a "12".

System 2000 hence comprises a plurality of reflective optical devices 2005-1 ... 2005-s−1 and 2005-s, also referred to herein as, collectively, plurality of reflective optical devices 2005 and, generically, as a reflective optical device 2005. In system 2000, each one of plurality of reflective optical devices 2005 comprises a DMD having mirrors that can be independently tilted, positioned or switched to, for example, direct portions of light received by the respective DMD along a particular light path or light paths. Hence, for the purposes of explaining system 2000, the plurality of reflective optical devices 2005 will be referred to as DMDs 2005.

First variable reflective beam splitter 2005-1, also referred to herein as DMD 2005-1, comprises example mirrors 2056-1 and 2061-1. Second last reflective optical device 2005-$s$-1, also referred to herein as DMD 2005-$s$-1, comprises example mirrors 2056-$s$-1 and 2061-$s$-1. Last reflective optical device, also referred to herein as DMD 2005-$s$, comprises example mirrors 2056-$s$ and 2061-$s$. It is understood that mirrors 2056-1, 2061-1 ... 2056-$s$, 2061-$s$ are representative and, according to some implementations, DMD 2005-1 ... 2005-$s$ can each comprise more than two mirrors, and indeed generally comprise thousands of mirrors, depending on the size and resolution of each respective DMD 2005. According to some implementations, mirrors 2056-1, 2061-1 ... 2056-$s$, 2061-$s$ as depicted each represent more than one mirror. Hence, for example, mirror 2056-1 can be referred to as mirrors 2056-1 and mirror 2061-1 can be referred to as mirrors 2061-1. It is understood that any suitable configuration of DMDs 2005-1 to 2005-$s$ and mirrors 2056-1, 2061-1 ... 2056-$s$, 2061-$s$ can be used in system 2000.

DMD 2005-1 is configured to receive light 2010, having intensity $I_0$, along an input light path, such as light path 2030. Light 2010 illuminates mirrors 2056-1 and 2061-1. By tilting mirror 2056-1, DMD 2005-1 directs a portion of light 2010 by reflection as first portion 2015, having intensity $I_1$, along a first light path 2020-1. By tilting mirror 2061-1, DMD 2005-1 directs a second portion of light 2010, as second portion 2025 having intensity $I_0 - I_1$, to another one of the plurality of DMDs 2005, which can be downstream of DMD 2005-1. According to the implementation shown, second portion 2025 is directed by reflection along light path 2036 to another one of DMDs 2005. It is understood that substantially all of received light 2010 is directed by DMD 2005-1 (by tilting mirrors 2056-1 and 2061-1 accordingly) in the direction of first portion 2015 and/or in the direction of second portion 2025; in other words, each one of DMDs 2005 is configured to minimize absorption of light.

DMD 2005-$s$-1 is configured to receive portion of light 2040, having intensity $I_r$, along light path 2041 from a previous one of DMDs 2005. Light 2040 illuminates mirrors 2056-$s$-1 and 2061-$s$-1. By tilting mirror 2056-$s$-1, DMD 2005-$s$-1 directs portion of light 2045 by reflection along light path 2020-$s$-1, at intensity $I_{s-1}$. By tilting mirror 2061-$s$-1, DMD 2005-$s$-1 directs portion of light 2050, also referred to herein as remaining light 2050, by reflection along light path 2046 to DMD 2005-$s$. As depicted in FIG. 20, portion of light 2050 has intensity $I_r - I_{s-1}$.

DMD 2005-$s$ is configured to receive remaining light 2050, which illuminates mirrors 2056-$s$ and 2061-$s$, and, by tilting mirrors 2056-$s$ and 2061-$s$, and divide remaining light 2050 into two portions, 2055 and 2060. DMD 2005-$s$ is further configured to direct portion 2055, having intensity $I_s'$, along light path 2020-$s$ and portion 2060 along light path 2020-$s+1$ at intensity $I_{s+1}$. According to some implementations, one or more of first portion 2015, portion light 2045, portion 2055 and portion 2060 is relayed to one or more projectors via optical fibres, such as optical fibres 103, 203 in FIGS. 1 and 2.

Generally, in a DMD, each mirror is switched or tilted between different positions over the course of its duty cycle. The portion of the received light directed along a particular light path, and, hence, the intensity of the directed portion of light, is dependent on the portion of the duty cycle the mirror or mirrors spend in a position to direct received light along that particular light path. In other words, the portion of the duty cycle each DMD mirror spends in a particular position dictates the intensity ("brightness") of the light directed by that mirror.

For example, the greater the portion of an associated duty cycle mirror 2056-1 spends in a position to direct first portion of light 2015 along first light path 2020-1, the greater the intensity, $I_1$.

Optical properties of reflective optical devices 1105 are now described in more detail. According to some implementations, at least one optical property of one or more of the plurality of reflective optical devices 1105 is adjustable to variably apportion received light. For example, according to some implementations, at least one of the plurality of reflective optical devices 1105 comprises a variable neutral density filter. According to some implementations, the at least one optical property that is adjustable is a reflectivity of the variable neutral density filter. According to some related implementations, the reflectivity of the variable neutral density filter is one of rotationally variable and linearly variable. According to some implementations, the reflectivity of the variable neutral density filter is continuously variable. According to some implementations, the reflectivity of the variable neutral density filter is continuously variable from approximately 1% to approximately 100%. According to some implementations, one or more of the plurality of reflective optical devices 1105 has a variable thickness optical coating to such that the reflectivity of the one or more of the plurality of reflective optical devices 1105 is adjustable. According to some implementations, the variable thickness optical coating comprises a dielectric coating.

Figure 13:
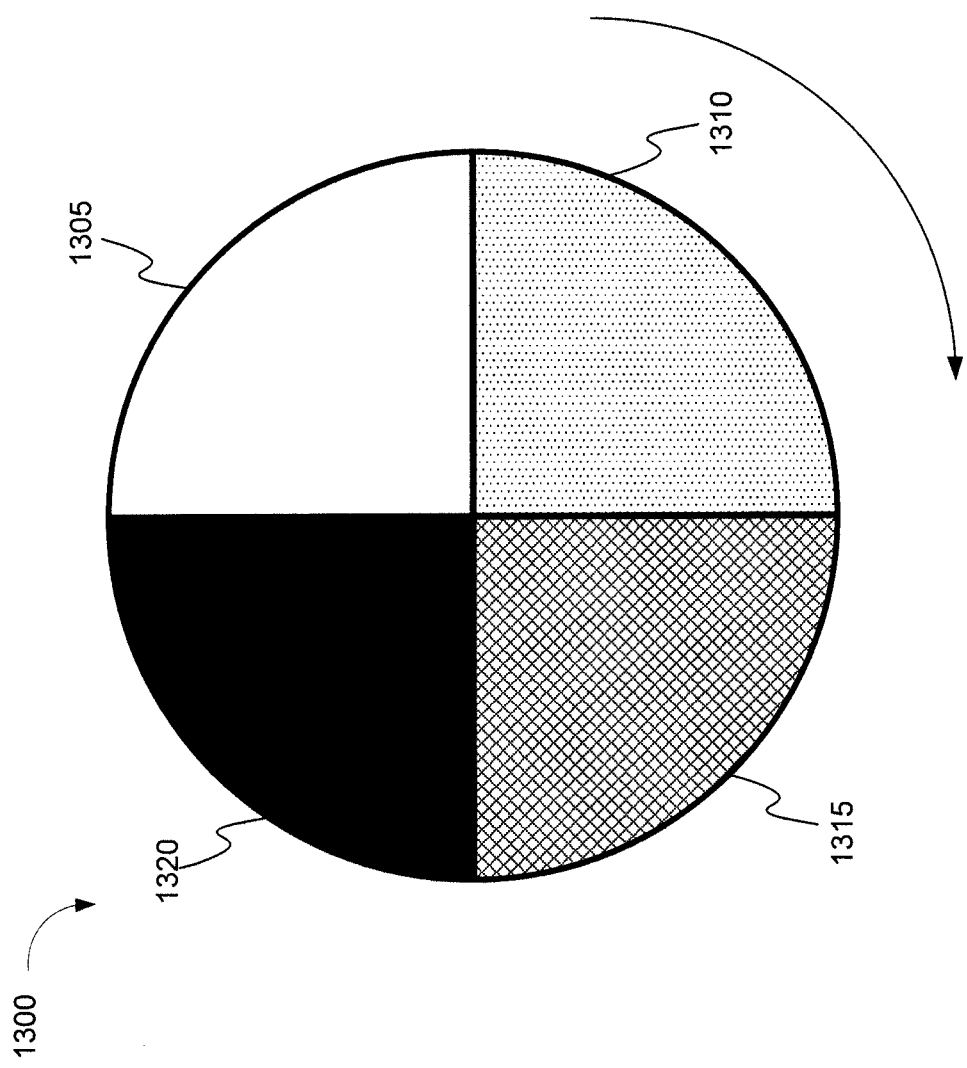
FIG. 13 depicts a variable neutral density filter in which the reflectivity is rotationally variable, according to non-limiting implementations.

For example, FIG. 13 depicts variable neutral density filter 1300, according to non-limiting implementations, in which the reflectivity is rotationally variable. Variable neutral density filter 1300 comprises four sections of different reflectivity, 1305, 1310, 1315 and 1320. Section 1305 is less reflective, and hence more transmissive, than sections 1310, 1315 and 1320. Section 1320 is more reflective, and hence less transmissive, than sections 1305, 1310 and 1315. According to some implementations, section 1320 is configured reflect substantially all light received at section 1320 (e.g. the reflectivity of section 1320 is approximately 100%). It is understood that the arrangement and number of reflective sections of variable neutral density filter 1300 is non-limiting and, according to some implementations, variable neutral density filter 1300 has more or fewer than four sections of reflectivity. Furthermore, according to some implementations, two or more of sections 1305, 1310, 1315 and 1320 have substantially similar reflectivity. According to some implementations, variable neutral density filter 1300 has a generally circular or disk-like shape. According to some implementations, variable neutral density filter 1300 has a generally annular shape.

In operation, light is received at variable neutral density filter 1300 at one of sections 1305, 1310, 1315 and 1320. According to some implementations, light is received at variable neutral density filter 1300 generally parallel to a central axis of a respective one of sections 1305, 1310, 1315 and 1320. A portion of the received light is then directed along one light path by reflection, based on the reflectivity of the receiving section, and another portion is directed along another light path by transmission. The amount of the reflected portion and transmitted portion can be adjusted by rotating variable neutral density filter 1300 such that light is received by variable neutral density filter 1300 at another one of sections 1305, 1310, 1315 and 1320.

Although sections 1305, 1310, 1315 and 1320 are depicted as distinct sections or regions of reflectivity and transmissibility, according to some implementations, the transition between sections 1305, 1310, 1315 and 1320 is smooth such that the reflectivity of variable neutral density filter 1300 is continuously variable. According to some related implementations, the reflectivity and transmissibility of variable neutral density filter 1300 is rotationally graduated such that the respective amounts of the directed and divided portions of received light, and hence the respective intensities of the directed and divided portions of light, can be more variably tuned.

Figure 14:
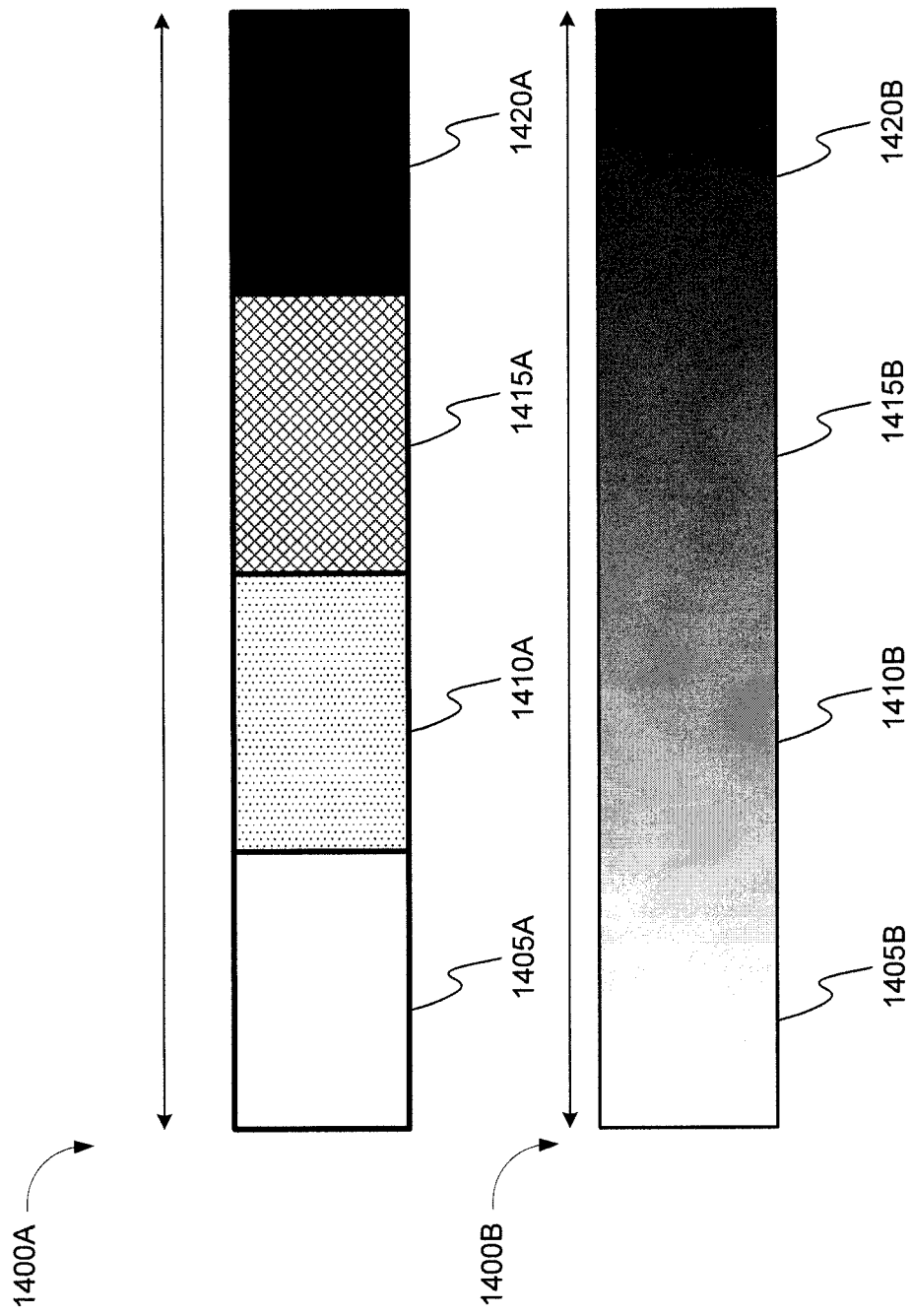
FIG. 14 depicts variable neutral density filters 1400A and 1400B in which the reflectivity is linearly variable, according to non-limiting implementations.

As another example, FIG. 14 depicts variable neutral density filter 1400A and variable neutral density filter 1400B, according to non-limiting implementations, in which the reflectivity is linearly variable. Variable neutral density filter 1400A comprises sections 1405A, 1410A, 1415A and 1420A. Section 1405A is less reflective, and hence more transmissive, than sections 1410A, 1415A and 1420A. Section 1420A is more reflective, and hence less transmissive, than section 1405A, 1410A and 1415A. According to some implementations, section 1420A is configured reflect substantially all light received at section 1420A (e.g. the reflectivity of section 1420A is approximately 100%). It is understood that the arrangement and number of reflective sections of variable neutral density filter 1400A is non-limiting and, according to some implementations, variable neutral density filter 1400A has more or less than four sections of reflectivity. Furthermore, according to some implementations, two or more of sections 1405A, 1410A, 1415A and 1420A have substantially similar reflectivity.

In operation, light is received at variable neutral density filter 1400A at one of sections 1405A, 1410A, 1415A and 1420A. A portion of the received light is then directed along one light path by reflection, based on the reflectivity of the receiving section, and another portion is directed along another light path by transmission. The amount of the reflected portion and transmitted portion can be adjusted by linearly shifting variable neutral density filter 1400A such that light is received by variable neutral density filter 1400A at another one of sections 1405A, 1410A, 1415A and 1420A.

Although sections 1405A, 1410A, 1415A and 1420A are depicted as distinct sections or regions of reflectivity and transmissibility, according to some implementations, the transition between sections 1405A, 1410A, 1415A and 1420A is smooth such that the reflectivity of variable neutral density filter 1400A is continuously variable. According to some related implementations, the reflectivity and transmissibility of variable neutral density filter 1400A is linearly graduated such that the respective amounts of the directed and divided portions of received light, and hence the respective intensities, can be more variably tuned. According to some implementations, variable neutral density filter 1400A comprises a strip.

For example, the reflectivity of variable neutral density filter 1400B is continuously variable from position 1405B, which is less reflective, and hence more transmissive, than position 1410B, 1415B and 1420B, to position 1420B, which is more reflective, and hence less transmissive, than positions 1405B, 1410B and 1415B.

Figure 15:
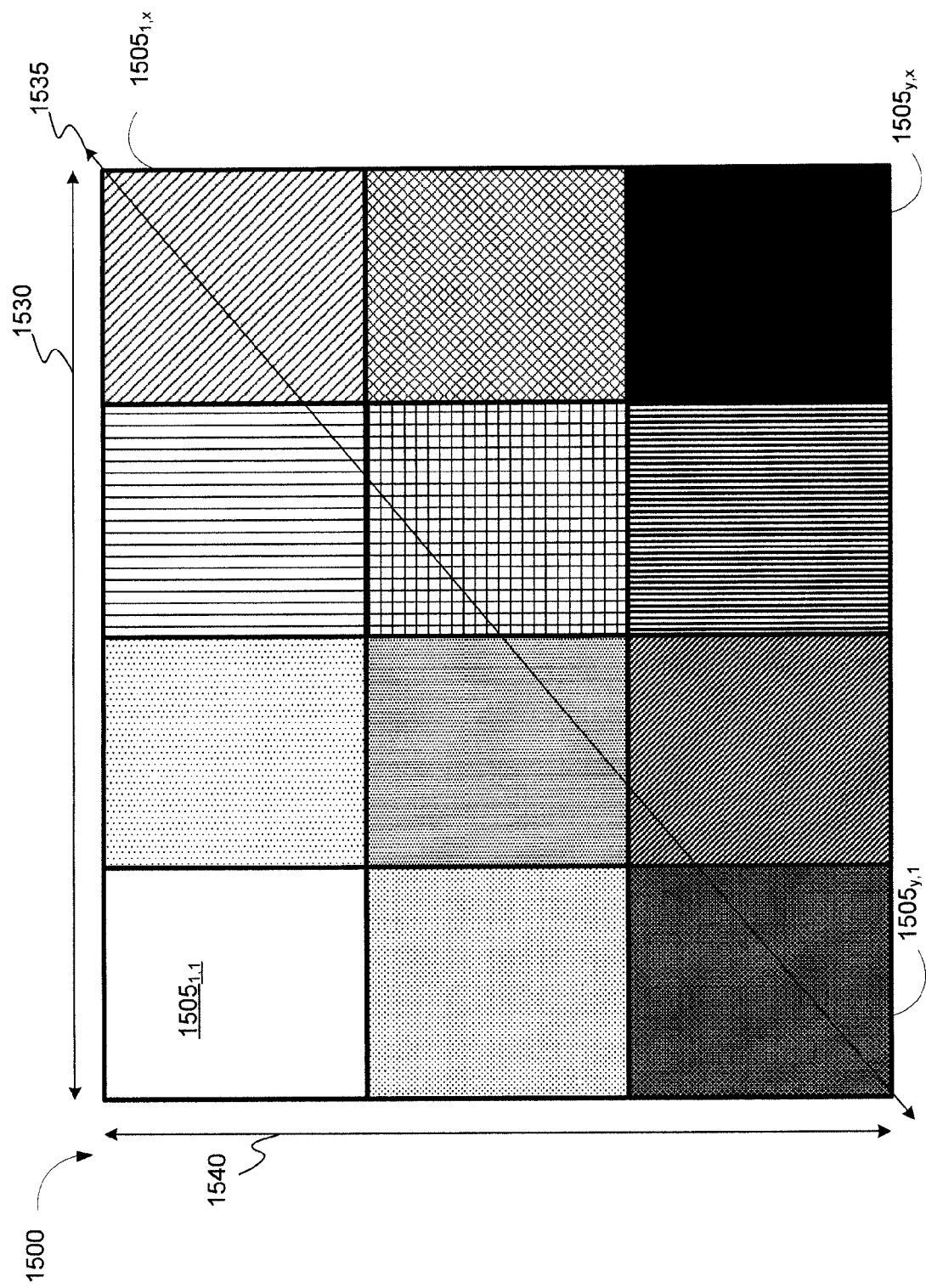
FIG. 15 depicts a variable neutral density filter in which the reflectivity is linearly variable in a vertical direction, a lateral direction and a diagonal direction, according to non-limiting implementations.

As another example, FIG. 15 depicts variable neutral density filter 1500, according to non-limiting implementations, in which the reflectivity is linearly variable in a vertical direction, a lateral direction and a diagonal direction, denoted by, for example, directional arrows 1530, 1535 and 1540. Variable neutral density filter 1500 comprises, for example, sections $1505_{1,1}$ to $1505_{y,x}$ of differing reflectivity. For example, section $1505_{(1,1)}$ is less reflective, and hence more transmissive, than sections $1505_{(y,1)}$ and $1505_{(y,x)}$. According to some implementations, section $1505_{y,x}$ is configured reflect substantially all light received at section $1505_{y,x}$ (e.g. the reflectivity of section $1505_{y,x}$ is approximately 100%). According to some implementations, variable density neutral filter is configured to receive light simultaneously at more than one of sections $1505_{1,1}$ to $1505_{y,x}$. In other words, according to some implementations, more than one of sections $1505_{1,1}$ to $1505_{y,x}$ can be illuminated simultaneously by received light 1110 to produce, for example, first portion 1115, having intensity $I_1$. It is understood that the arrangement and number of reflective sections of variable neutral density filter 1500 is non-limiting. Furthermore, according to some implementations, two or more of sections $1505_{1,1}$ to $1505_{y,x}$ have substantially similar reflectivity.

According to some implementations, variable neutral density filters 1300, 1400A or 1500 comprise a variable stepped filter.

According to some implementations, and with further reference to FIG. 20, one or more of the plurality of reflective optical devices comprises a DMD, such as DMD 2005-1 . . . 2005-s of system 2000. According to some related implementations, at least one optical property that can be adjusted is the configuration of the DMD mirrors to direct different portions of light received at the DMD along a particular light path, thereby tuning the intensity of the directed light. For example, for DMD 2005-1 the amount of first portion 2015 in comparison to or in proportion to second portion 2025 can be increased, thereby increasing intensity $I_1$, by tilting more of mirrors 2056-1, 2061-1 for a greater portion of an associated duty cycle to reflect received light 2010 along first light path 2020-1. By increasing the portion of an associated duty cycle mirrors 2056-1, 2061-1 spend in a position to reflect light along first light path 2020-1, the portion of the associated duty cycle 2056-1, 2061-1 spend in a position to reflect light along light path 2036 is decreased, thereby decreasing second portion 2025 in respect of first portion 2015.

According to some implementations, the at least one optical property of one or more of the plurality of reflective optical devices 1105 is adjustable independent of at least one optical property of another one of the plurality of reflective optical devices 1105. For example, according to some implementations, the reflectivity of first variable reflective beam splitter 1105-1 can be changed and/or adjusted (e.g. increased and/or decreased) independently, from the remaining reflective optical devices of the plurality of reflective optical devices 1105.

According to some implementations, adjusting the at least one optical property comprises switching or replacing at least one of the reflective optical devices 1105 with a variable reflective beam splitter having at least one different optical property.

Figure 16:
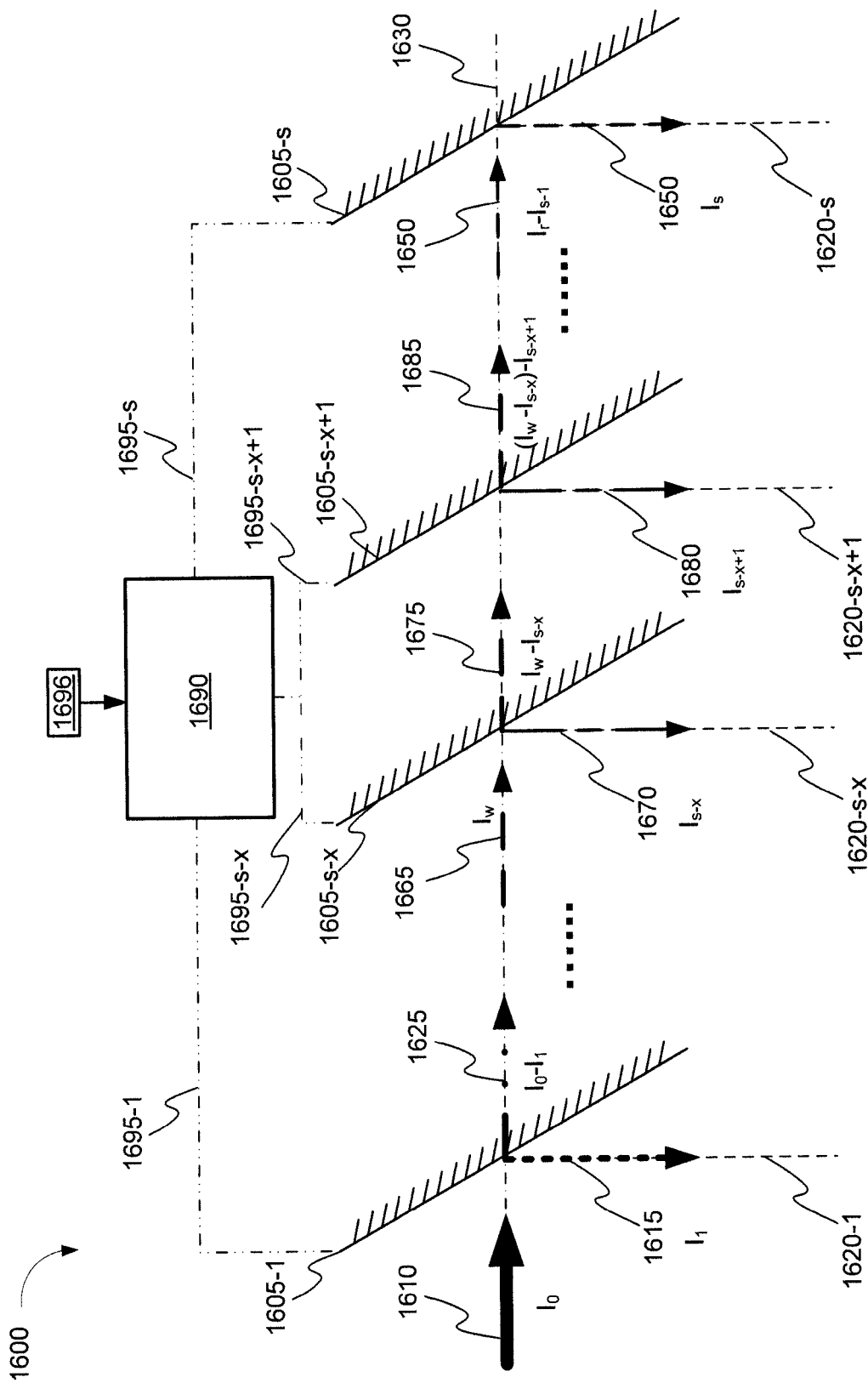
FIG. 16 depicts a system for distributing and tuning the intensity of light provided along multiple light paths, according to non-limiting implementations.

Attention is next directed to FIG. 16, which depicts system 1600 for distributing and tuning the intensity ("brightness") of light provided along multiple light paths, according to non-limiting implementations, and in which in which like elements are denoted by like or similar numbers to FIG. 11, however starting with a "16" rather than an "11".

System 1600 comprises a plurality of reflective optical devices 1605-1 to 1605-s, also referred to herein as, collectively, reflective optical devices 1605 and, generically, as a reflective optical device 1605. Plurality of reflective optical devices comprises first variable reflective beam splitter 1605-1. First variable reflective beam splitter 1605-1 is configured to receive light 1610, having intensity $I_0$, along an input light path, such as light path 1630, and direct a portion of light 1610 as first portion 1615, having intensity I$_1$, along a first light path 1620-1 and a second portion of light 1610, as second portion 1625 having intensity I$_0$–I$_1$, to another one of the plurality of reflective optical devices 1605, which can be downstream of first variable reflective beam splitter 1605-1. According to the implementation shown, second portion 1625 continues along light path 1630 to another one of the plurality of reflective optical devices 1605. As in system 1100, it is understood that substantially all of received light 1610 is directed by first variable beam splitter 1605-1 in the direction of first portion 1615 and/or in the direction of second portion 1625; in other words, each reflective optical device 1605 is configured to minimize absorption of light.

System 1600 depicts a subset of the plurality of reflective optical devices 1605-s-x to 1605-s-x+1, also referred to herein as subset 1605-s-x to 1605-s-x+1, located between first variable reflective beam splitter 1605-1 and last reflective optical device 1605-s. Each one of the subset 1605-s-x to 1605-s-x+1 is configured to receive previous light from a previous reflective optical device of the plurality of reflective optical devices 1605 and to direct one portion of the previous light along a respective light path and another portion of the previous light to a successive one of the plurality of reflective optical devices 1605. For example, reflective optical device 1605-s-x+1 is configured to receive previous light 1675, having intensity I$_w$–I$_{s-x}$, from previous reflective optical device 1605-s-x and direct portion 1670 along light path 1620-s-x, having intensity I$_{s-x}$, and another portion as previous light 1675 along light path 1630, and to direct portion of previous light 1680 along light path 1620-s-x+1, at intensity I$_{s-x+1}$, and another portion of previous light 1685, having intensity (I$_w$–I$_{s-x}$)–I$_{s-x+1}$, along light path 1630 to a successive one of the plurality of reflective optical devices 1605. Previous reflective optical device 1605-s-x receives light 1665 having intensity I$_w$ from another previous reflective optical device 1605-s-x−1 (not shown). According to some implementations, the successive one of the plurality of reflective optical device 1605 comprises last 1605-s which, for example, may be configured to receive remaining light 1650 and direct remaining light 1650, having intensity I$_s$, along light path 1620-s. According to some implementations, the previous comprises first variable reflective beam splitter 1605-1.

The intensity of light provided along a specific light path of any one of light paths 1120-1 to 1120-s, 1220-s, 1230 and 1620-1 to 1620-s can, for example, be determined using equation (1) below:

$$I_h = [R_h(1-R_{h-1})(1-R_{h-2})\ldots]I_0 \quad \text{Equation (1)}$$

Where h is the numeral of the specific light path, I$_h$ is the intensity of light directed along the specific light path h, I$_0$ is the intensity of the light received by the first variable reflective beam splitter, such as first variable reflective beam splitter 1105-1, and R$_h$, R$_{h-1}$ ... are the reflectivities of the reflective optical devices upstream the specific reflective optical device directing light along the specific light path h. It is understood that according to some implementations, equation (1) can also be used to set the reflectivities of reflective optical devices 1105 to 1605.

As stated above, according to some implementations, at least one of the plurality of reflective optical devices comprises a variable neutral density filter in which the reflectivity is linearly variable in a vertical direction, a lateral direction and a diagonal direction, such as variable neutral density filter 1500. According to some related implementations, more than one of sections 1505$_{1,1}$ to 1505$_{y,x}$ can be illuminated simultaneously by received light 1110. In at least such implementations, the reflectivity value of variable neutral density filter 1500 in equation (1) would be the overall reflectance of the sections 1505$_{1,1}$ to 1505$_{y,x}$ being illuminated by received light 1110.

Furthermore, since the individual light intensities I$_1$ to I$_s$ (and I$_{s+1}$) are the result of dividing, directing, apportioning or splitting light received at the first variable reflective beam splitter 1105-1, 1605-1, such as light 1110 and 1610, the sum of the individual light intensities I$_1$ to I$_s$ (and I$_{s+1}$) is approximately equal to the intensity, I$_0$, of the light received by the first variable reflective beam splitter, such as first variable reflective beam splitter 1105-1.

According to some implementations, system 1600 comprises a control system 1690 in communication with the plurality of reflective optical devices 1605 and configured to adjust the at least one optical property of one or more of the plurality of reflective optical devices 1605. According to some implementations, control system 1690 is in communication with the plurality of reflective optical devices 1605 along communication links 1695-1 to 1695-s. According to some implementations, communication links 1695-1 to 1695-s comprises one or more of wired and wireless communication links. According to some implementations, control system 1690 is configured to adjust the at least one optical property of one or more of the plurality of reflective optical devices 1605 in accordance with control data 1696 received by control system 1690. According to some implementations, control data 1696 comprises computer-readable program code having computer executable instructions regarding an intensity of one or more of the reflective optical devices 1605. For example, control data 1696 could comprise instructions to control a change in intensity of one or more of the reflective optical devices 1605. According to some implementations, control system 1690 has a processor configured to perform one or more of rotation, linear shifting, switching of optical components and configuration of components, such as DMD mirrors, of the plurality of reflective optical devices 1605 in response to receipt of control data 1696 and/or determining a change in control data 1696.

The described systems for distributing and tuning the intensity ("brightness") of light provided along multiple light paths can be utilized in a variety of applications, such as projection systems. For example, according to some implementations, the described systems for distributing and tuning the intensity ("brightness") of light provided along multiple light paths can be utilized in conjunction with light distribution systems 105, 205, and 405.

Figure 17:
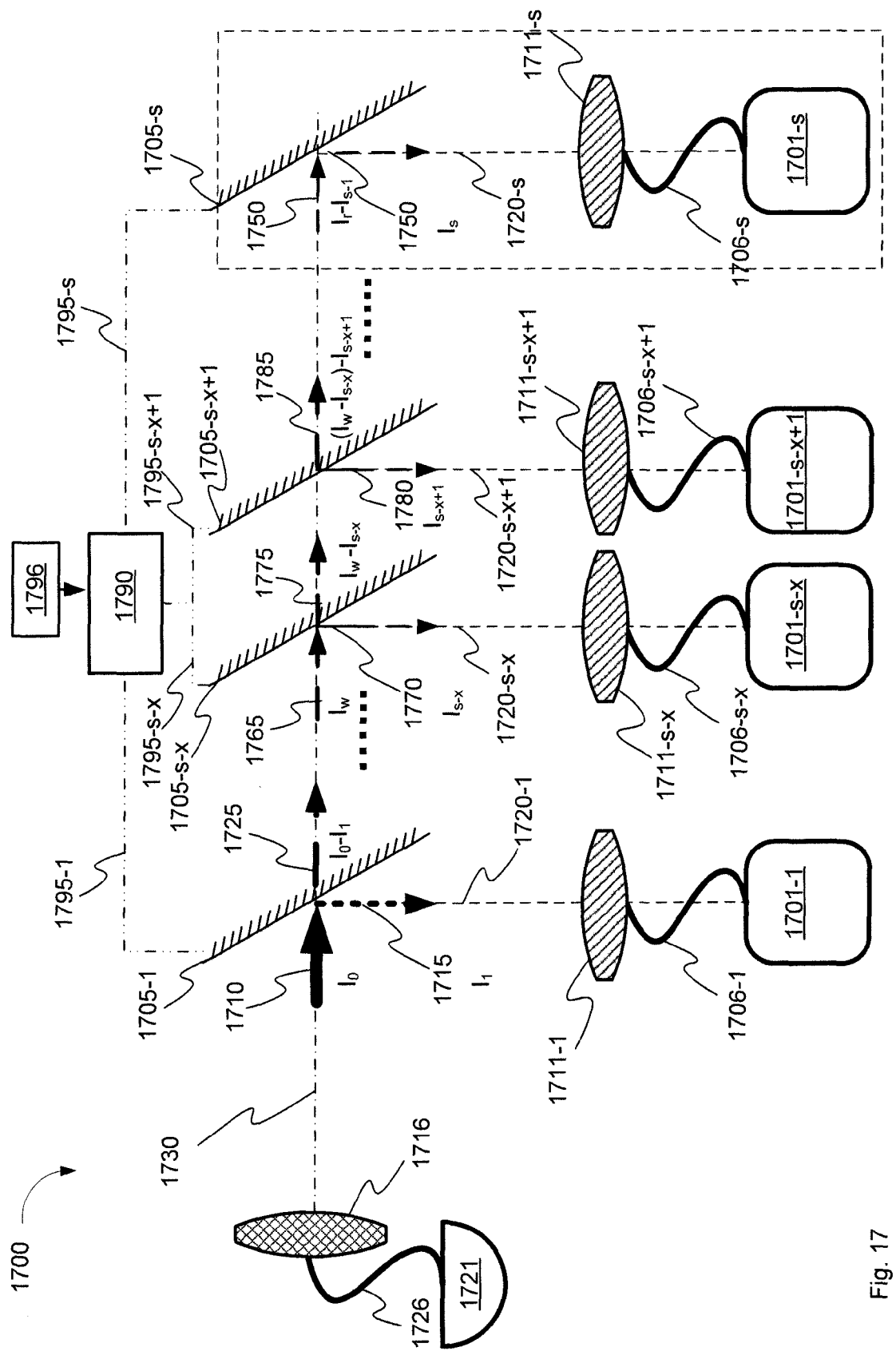
FIG. 17 depicts a projection system which incorporates a system for distributing and tuning the intensity of light provided along multiple light paths, according to non-limiting implementations.

Attention is directed to FIG. 17, which depicts projection system 1700 which incorporates a system for distributing and tuning the intensity ("brightness") of light provided along multiple light paths, according to non-limiting implementations, and in which in which like elements are denoted by like or similar numbers to FIGS. 11 to 16, however starting with a "17" rather than, for example, an "16", as in FIG. 16.

System 1700 comprises a plurality of reflective optical devices 1705-1 to 1705-s, also referred to herein as, collectively, reflective optical devices 1705 and, generically, as a reflective optical device 1705. Plurality of reflective optical devices comprises first variable reflective beam splitter 1705-1. First variable reflective beam splitter 1705-1 is configured to receive light 1710, having intensity I$_0$, along an input light path, such as light path 1730, and direct a portion of light 1710 as first portion 1715, having intensity I$_1$, along a first light path 1720-1 and a second portion of light 1710, as second portion 1725 having intensity I$_0$–I$_1$, to another one of the plurality of reflective optical devices 1705, which can be downstream of first variable reflective beam splitter 1705-1. According to the implementation shown, second portion

1725 continues along light path 1730 to another one of the plurality of reflective optical devices 1705. As in system 1100, it is understood that substantially all of received light 1710 is directed by first variable beam splitter 1705-1 in the direction of first portion 1715 and/or in the direction of second portion 1725; in other words, each reflective optical device 1605 is configured to minimize absorption of light.

System 1700 depicts a subset of the plurality of reflective optical devices 1705-$s$-$x$ to 1705-$s$-$x$+1, also referred to herein as subset 1705-$s$-$x$ to 1705-$s$-$x$+1, located between first variable reflective beam splitter 1705-1 and last reflective optical device 1705-$s$. Each one of the subset 1705-$s$-$x$ to 1705-$s$-$x$+1 is configured to receive previous light from a previous reflective optical device of the plurality of reflective optical devices 1705 and to direct one portion of the previous light along a respective light path and another portion of the previous light to a successive one of the plurality of reflective optical devices 1705. For example, reflective optical device 1705-$s$-$x$+1 is configured to receive previous light 1775, having intensity $I_w - I_{s-x}$, from previous reflective optical device 1705-$s$-$x$ and direct portion 1770 along light path 1720-$s$-$x$, having intensity $I_{s-x}$, and another portion as previous light 1775 along light path 1730, and to direct portion of previous light 1780 along light path 1720-$s$-$x$+1, at intensity $I_{s-x+1}$, and another portion of previous light 1785, having intensity $(I_w - I_{s-x}) - I_{s-x+1}$, along light path 1730 to a successive one of the plurality of reflective optical devices 1705. Previous reflective optical device 1705-$s$-$x$ receives light 1765 having intensity $I_w$ from another previous reflective optical device 1705-$s$-$x$−1 (not shown). According to some implementations, the successive one of the plurality of reflective optical device 1705 comprises last 1705-$s$ which, for example, may be configured to receive remaining light 1750 and direct remaining light 1750, having intensity $I_s$, along light path 1720-$s$. According to some implementations, the previous comprises first variable reflective beam splitter 1705-1.

Projection system 1700 comprises a plurality of projectors 1701-1 to 1701-$s$, referred to, collectively, as plurality of projectors 1701 and, generically, projectors 1701. Projectors 1701 are depicted in one-to-relationship with reflective optical devices 1705. In other words, according to the implementation of projection system 1700 shown in FIG. 17, each one of projectors 1701 is associated with one of reflective optical devices 1705. According to some implementations, plurality of projectors 1701 is configured to receive one or more of: first portion 1715 and remaining light 1750.

According to some implementations, one or more of first portion 1715, remaining light 1750 and at least one of portions 1755 and 1760 is provided to projectors 1701 by at least one optical fiber cable, such as optical fiber cable 1706-1, 1706-$s$ and 1706-$s$+1, referred to collectively as optical fiber cables 1706.

Furthermore, system 1700 comprises another plurality of projectors 1701-$s$-$x$, 1701-$s$-$x$+1 configured to receive portions of light, 1770 and 1780, directed along respective light paths 1720-$s$-$x$ and 1720-$s$-$x$+1. According to some implementations, the another plurality of projectors 1701-$s$-$x$, 1701-$s$-$x$+1 is a subset of projectors 1701.

According to some implementations, one or more of portions of light 1770 and 1780 is provided to projectors 1701-$s$-$x$, 1701-$s$-$x$+1 by at least one optical fiber cable, such as optical fiber cable 1706-$s$-$x$ and 1706-$s$-$x$+1.

It is understood that optical fiber cables 1706-1, 1706-$s$, 1706-$s$-$x$, 1706-$s$-$x$+1 and 1706-$s$+1, according to some implementations, comprises one optical fiber and, according to some implementations, a plurality of optical fibers.

Figure 18:
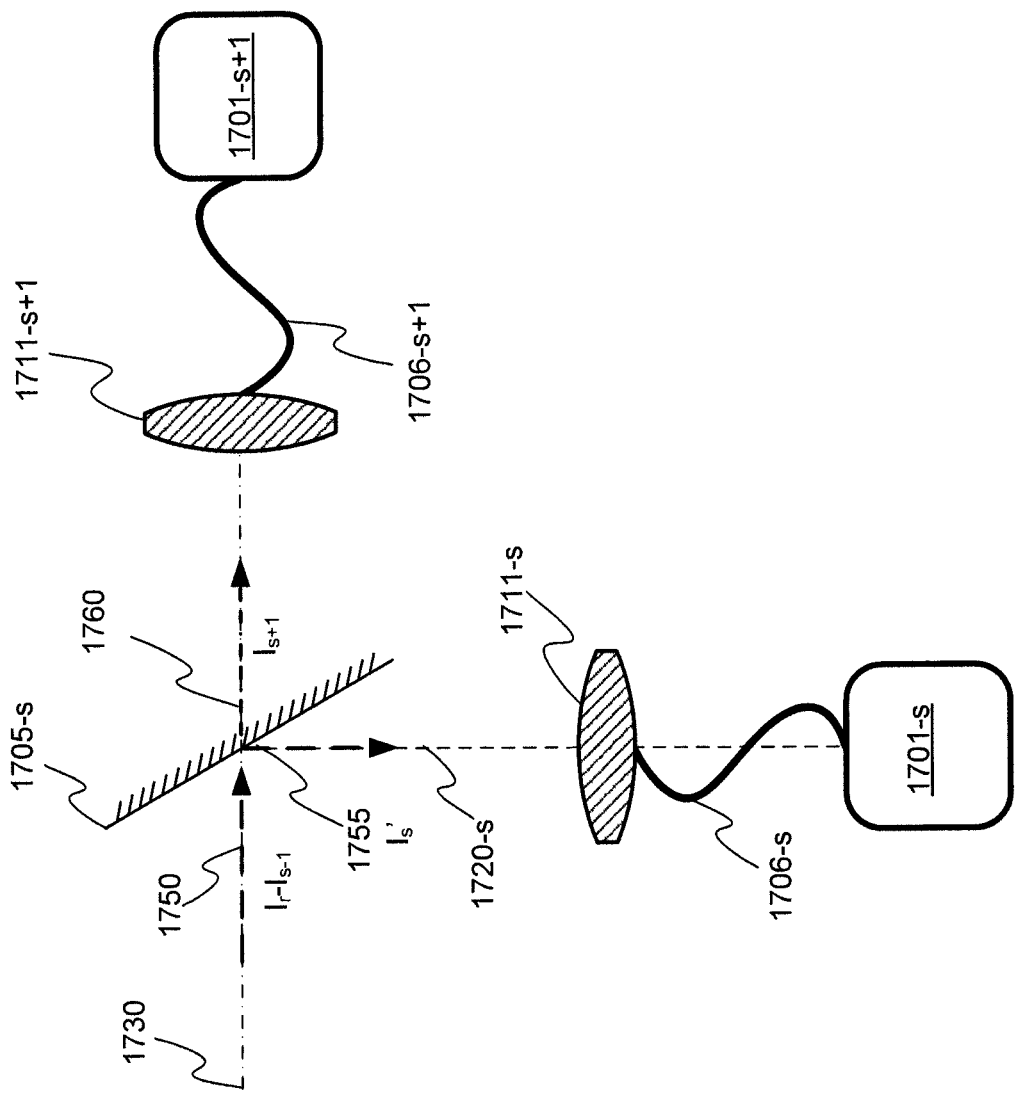
FIG. 18 depicts a last reflective optical devices incorporated into the projection system depicted in FIG. 17, according to non-limiting implementations.

As shown in FIGS. 17 and 18, according to some implementations, projection system 1700 further comprises intermediate optics located in one or more of the first light path, the last light path, at least one of the two different light paths and the respective light path, the intermediate optics for relaying one or more of the first portion, the remaining light, the one portion of the previous light and at least one of the two portions prior to receipt by the plurality of projectors. For example, as shown in FIGS. 17 and 18, system 1700 can comprise intermediate optics 1711-1 to 1711-$s$, 1711-$s$+1, referred to collectively as intermediate optics 1711, located in one or more of first light path 1720-1, last light path 1720-$s$, respective light paths 1720-$s$-$x$ and 1720-$s$-$x$+1, and light path 1730 to relay one or more of: first portion 1715, remaining portion 1750 or 1755, portion 1760, portion of previous light 1765 and another portion of previous light 1775 prior to receipt by projectors 1701. According to some implementations, intermediate optics 1711-1 to 1711-$s$ and 1711-$s$+1 comprises one or more of integrating rods, lenses, prisms, filters, mirrors and spatial light modulators. According to some implementations, intermediate optics 1711-1 to 1711-$s$ and 1711-$s$+1 relays one or more of first portion 1715, remaining portion 1750 or 1755, portion 1760, portion of previous light 1765 and another portion of previous light 1775 by performing one or more of: homogenization, splitting received light into one or more wavelengths and collimation.

According to some implementations, projection system 1700 comprises light source 1721 to provide light 1710, having intensity $I_0$, to first variable reflective beam splitter 1705-1. According to some implementations, light source 1721 comprises one of a laser light source and a lamp light source. According to some implementations, light source 1721 comprises one of a white light laser and a blue light laser. According to some implementations, light 1710 is provided by light source 1721 to first variable reflective beam splitter 1705-1 by at least one optical fiber cable, such as optical fiber cable 1726.

Furthermore, according to some implementations, system 1700 comprises relay optics 1716 located prior to the plurality of reflective optical devices along an input light path, such as light path 1730, to relay light 1710 before receipt by first variable reflective beam splitter 1705-1. According to some implementations, relay optics 1716 can comprise collimating optics. According to some implementations, light 1710 is provided by light source 1721 to first variable reflective beam splitter 1705-1 by at least one optical fiber cable, such as optical fiber cable 1726, and via relay optics 1716.

According to some implementations, system 1700 comprises a control system 1790 in communication with the plurality of reflective optical devices 1705 and configured to adjust the at least one optical property of one or more of the plurality of reflective optical devices 1705. According to some implementations, control system 1790 is in communication with the plurality of reflective optical devices 1705 along communication links 1795-1 to 1795-$s$. According to some implementations, communication links 1795-1 to 1795-$s$ comprises one or more of wired and wireless communication links. According to some implementations, control system 1790 is configured to adjust the at least one optical property of one or more of the plurality of reflective optical devices 1705 in accordance with control data 1796 received by control system 1790. According to some implementations, control data 1796 comprises computer-readable program code having computer executable instructions regarding an intensity of one or more of the reflective optical devices 1705. For example, control data 1796 could comprise instructions to control a change in intensity of one or more of the reflective optical devices 1705. According to some implementations, control system 1790 has a processor configured to perform one or more of rotation, linear shifting, switching of optical components and configuration of components, such as DMD mirrors, of the plurality of reflective optical devices 1705 in response to receipt of control data 1796 and/or determining a change in control data 1796.

As discussed above, projectors 1701 are depicted in one-to-relationship with reflective optical devices 1705. However, according to some related implementations, projectors 1701 are not in a one-to-one relationship with reflective optical devices 1705. According to some implementations, the number of projectors 1701 exceeds the number of reflective optical devices 1705. For example, according to some implementations, plurality of projectors 1701 comprises projector 1701-$s$+1, shown in FIG. 18. Similarly to last reflective optical device 1205-$s$, last reflective optical device 1705-$s$ may be configured to receive remaining light 1750 at intensity $I_r$–$I_{s-1}$, divide remaining light 1750 into two portions, 1755 and 1760, and direct portion 1755, having intensity $I_s'$, along light path 1720-$s$ and portion 1760 along light path 1730 at intensity $I_{s+1}$ for receipt by projector 1701-$s$+1. Hence, according to some implementations, plurality of projectors 1701 is configured to receive one or more of: first portion 1715, remaining light 1750 and at least one of portions 1755 and 1760.

Figure 19:
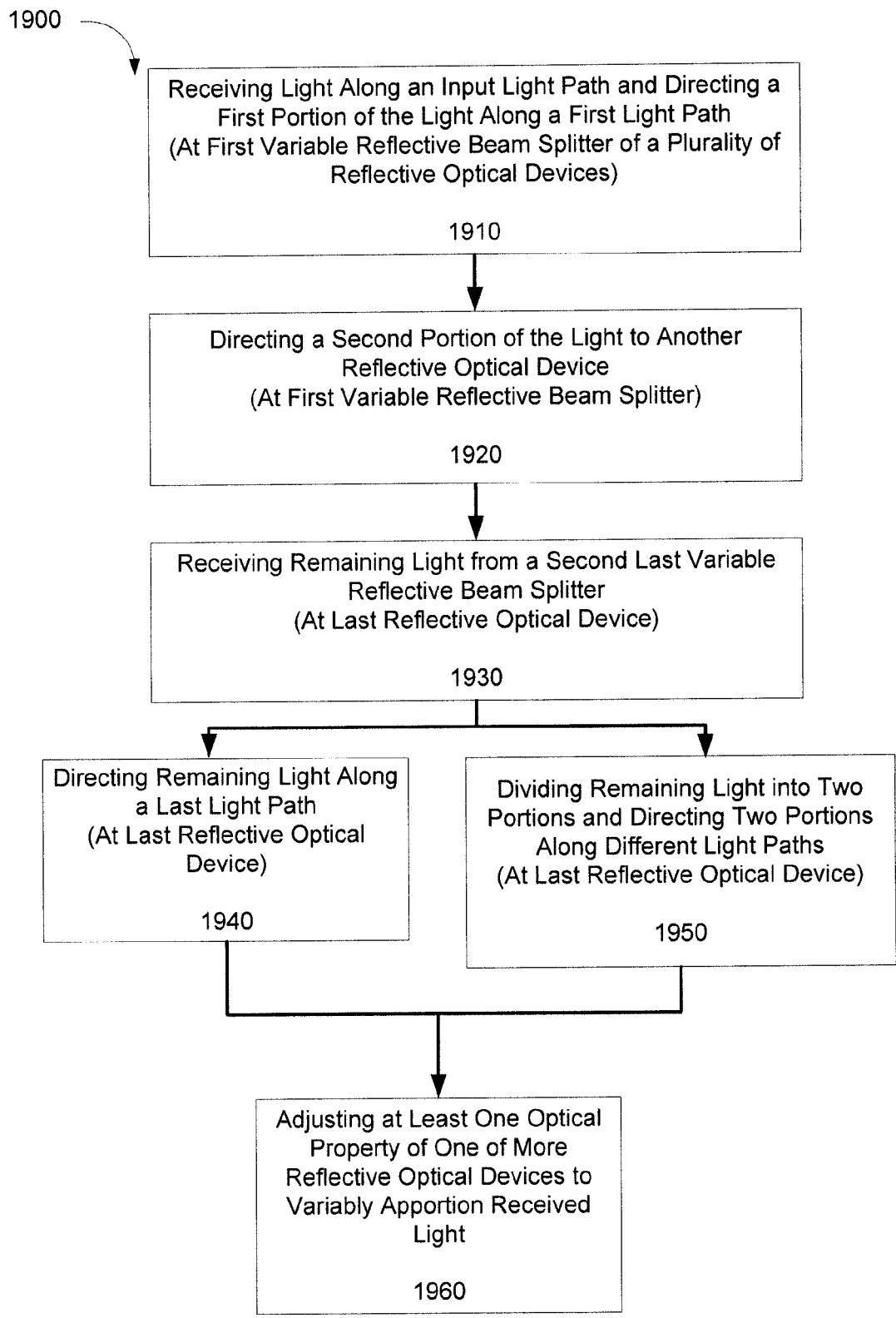
FIG. 19 depicts a flowchart of a method for distributing and tuning the intensity of light provided along multiple light paths, according to non-limiting implementations.

Attention is now directed to FIG. 19 which depicts a flowchart of method 1900 for distributing and tuning the intensity ("brightness") of light provided along multiple light paths, according to non-limiting implementations. In order to assist in the explanation of method 1900, it will be assumed that method 1900 is performed using projection system 1700. Furthermore, the following discussion of method 1900 will lead to a further understanding of projection system 1700 and its various components. However, it is to be understood that projection system 1700 and/or method 1900 can be varied, and need not work exactly as discussed herein in conjunction with each other, and that such variations are within the scope of present implementations. For example, method 1900 need not be performed in the exact sequence as shown, unless otherwise indicated; and likewise various blocks may be performed in parallel rather than in sequence; hence the elements of method 1900 are referred to herein as "blocks" rather than "steps". Furthermore, it will be understood that method 1900 can also be implemented by systems 1100 and 1600, according to some implementations.

At block 1910, at first variable reflective beam splitter 1705-1 of plurality of reflective optical devices 1705, light 1710 is received along an input light path, such as light path 1130, and first portion 1715 of light 1710 is directed along first light path 1720-1.

At block 1920, at first variable reflective beam splitter 1705-1, second portion 1725 of light 1710 is directed to another one of plurality of reflective optical devices 1705. For example, second portion 1725 can be directed to reflective optical device 1705-$s$-$x$ and then portion of previous light 1765 comprises second portion 1725.

At block 1930, at last reflective optical device 1705-$s$, remaining light 1750 is received from a second last reflective optical device. According to some implementations, the second reflective optical device comprises reflective optical device 1705-$s$-$x$+1 and remaining light 1750 comprises another portion of previous light 1785.

At blocks 1940 and 1950, at last reflective optical device 1705-$s$, one or more of: directing remaining light 1750 along last light path 1720-$s$; and, dividing remaining light 1750 into two portions, portions 1755 and 1760, and directing portions 1755, 1760 along two different light paths (such as last light path 1720-$s$ and light path 1730) is performed.

At block 1960, at least one optical property of one or more of plurality of reflective optical devices 1705 is adjusted to variably apportion received light. For example, according to some implementations, the reflectivity of one of reflective optical devices 1705 is increased, thereby increasing the portion of light received at the one or more reflective optical devices 1705 that is directed along the associated one of light paths 1720-1 to 1720-$s$. As a result, the intensity of light received by the associated one of projectors 1701 is increased.

Hence, according to some implementations, by adjusting at least one optical property of one or more of reflective optical devices 1705, the intensity of light received by a respective one of projectors 1701 can be altered and or tuned (such as one of first portion 1715, remaining light 1750, at least one of portions 1755 and 1760, and portions of light, 1770 and 1780). According to some implementations, such tuning can be performed "on-the-fly" on an as needed or desired basis by adjusting at least one optical property of a particular one or ones of reflective optical devices 1705. As a result, according to some implementations, drastic re-modification of the light distribution or light intensity tuning system to tune light received by any one of projectors 1705 can be avoided.

As described above, each one of the plurality of reflective optical devices 1105 to 1705 is configured to direct or divide substantially all of the light received at the respective reflective optical device. Furthermore, the light received at any one respective reflective optical device is based on, directly or indirectly, the light received by the first variable reflective beam splitter, such as light 1110, 1610 and 1710 received by first variable reflective beam splitter 1105-1, 1605-1, 1705-1. As a result, according to some implementations, systems 1100, 1600 and 1700 require only a single light source to tune the intensity of light directed along one or more light paths, such as light paths 1720-1 to 1720-$s$. This can reduce system complexity, increase system efficiency and, as a result, can lead to reduced costs in comparison to other typical light distribution and intensity tuning systems. For example, some typical light distribution and intensity tuning systems require a light source for each light path in which light intensity will be tuned. As a result, these typical systems tend to dump light that is in excess of what is necessary to provide light at the desired intensity along a particular light path.

Hence, described herein is a system that can use a blue laser light source for providing light to a plurality of projectors by using colour conversion systems to convert the blue laser light to other colours of light. Hence, components particular to conveying blue laser light can be used prior to the colour conversion systems, which reduce complexity of the system and reduce etendue, as compared to systems where a white light source is used. Further, light distribution systems can be used to equally distribute the light to the projectors and/or the colour conversion systems. The light distribution systems can be based on sub-integrating rods and/or an array of lenslets. By using such optical components, light output from a main integrator rod is equally distributed by dividing the output area (of the main integrating rod) into multiple smaller areas. These smaller areas are equal and the boundary between the smaller areas is negligible thus the division is done efficiently (no light lost). The areas are designed so the etendue is matched from the main integrating rod to the multiple projectors. Further, by using components that are stacked and/or adjacent to one another a substantial portion of the light emitted by the main integrating rod is collected. Alternatively, a light distribution system can be used that distributes light based on variable intensity components. As well as tuning the light to variable intensity. Indeed, any of the light distribution systems described herein can be used with the blue laser light source and/or a white light source and/or a light source of other colours.

Those skilled in the art will appreciate that in some implementations, the functionality of systems 1100, 1600 and 1700 can be implemented using pre-programmed hardware or firmware elements (e.g., application specific integrated circuits (ASICs), electrically erasable programmable read-only memories (EEPROMs), etc.), or other related components. In other implementations, the functionality of systems 1100, 1600 and 1700 can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Furthermore, it is appreciated that the computer-readable program can be stored as a computer program product comprising a computer usable medium. Further, a persistent storage device can comprise the computer readable program code. It is yet further appreciated that the computer-readable program code and/or computer usable medium can comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium can be either a non-mobile medium (e.g., optical and/or digital and/or analog communications lines) or a mobile medium (e.g., microwave, infrared, free-space optical or other transmission schemes) or a combination thereof.

Persons skilled in the art will appreciate that there are yet more alternative implementations and modifications possible, and that the above examples are only illustrations of one or more implementations. The scope, therefore, is only to be limited by the claims appended hereto.

What is claimed is:

1. A system comprising:
   an integrating rod comprising an output end opposite an input end, the integrator rod configured to emit, at the output end an integrated image of light received at the input end, the integrated image having an etendue $E_{img}$ and an area $A_{img}$ at a given distance from the output end; and,
   an apparatus comprising an input side located at the given distance, the apparatus configured to:
   receive, at the input side, the integrated image from the output end of the integrating rod;
   split the integrated image into a number N of sub-images, each of the sub-images having an area $A_{sub}$, and an etendue $E_{sub}$, such that $A_{img}$ is about $N*A_{sub}$, and $E_{img}$ is about $N*E_{sub}$; and,
   relay the sub-images,
   the apparatus further comprising:
   an array of lenslets in a one-to-one relationship with the number N of the sub-images, each of the lenslets configured to form a respective one of the sub-images, the array of lenslets comprising respective inputs adjacent to one another at the (liven distance, forming the input side of the apparatus; and,
   a telecentric relay system located between the output end of the integrating rod and the array of lenslets, the telecentric relay system confiaured to: relay the integrated image to the respective inputs of the array of lenslets, a total area of the respective inputs is the area $A_{img}$ of the integrated image at the given distance; magnify the integrated image to one of increase or decrease the area $Ai_{mg}$ of the integrated image at the given distance.

2. The system of claim 1, wherein $A_{img} = N*A_{sub}$.

3. The system of claim 1, wherein $E_{img} = N*E_{sub}$.

4. The system of claim 1, wherein the total area of the respective inputs is less than the area $A_{img}$ of the integrated image at the given distance.

5. The system of claim 1, wherein the integrated image is formed, by the telecentric relay system, at the respective inputs of the lenslets.

6. The system of claim 1, wherein a respective etendue $E_{ienslet}$ of each of the lenslets is about equal to the etendue $E_{sub}$ of the sub-images.

7. The system of claim 1, wherein the output end of the integrating rod located at an image position of the telecentric relay system, and the respective inputs of the array of lenslets are located at an image position of the of the telecentric relay system, coincident with the given distance.

8. The system of claim 1, further comprising a plurality of optical fibers, in a one-to-one relationship with the array of lenslets, each of the plurality of optical fibers configured to receive and relay a respective sub-image relayed by a respective lenslet.

9. The system of claim 8, wherein each of the plurality of optical fibers has an etendue $E_{fiber}$, about equal to the etendue $E_{sub}$ of the sub-images.

10. The system of claim 1, wherein the array of lenslets comprises an integrated structure.

* * * * *